(12) United States Patent
Yamaga et al.

(10) Patent No.: US 12,482,554 B2
(45) Date of Patent: Nov. 25, 2025

(54) DOSAGE NORMALIZATION FOR DETECTION OF ANOMALOUS BEHAVIOR

(71) Applicant: CareFusion 303, Inc., San Diego, CA (US)

(72) Inventors: Cynthia Yamaga, Oceanside, CA (US); Hien-Hoa Vu, Pearland, TX (US); Abhikesh Nag, San Diego, CA (US); Satya Varaprasad Allumallu, San Diego, CA (US); Dennis Tribble, Ormond Beach, FL (US)

(73) Assignee: CareFusion 303, Inc., San Diego, CA (US)

( * ) Notice: Subject to any disclaimer, the term of this patent is extended or adjusted under 35 U.S.C. 154(b) by 711 days.

(21) Appl. No.: 17/187,609

(22) Filed: Feb. 26, 2021

(65) Prior Publication Data

US 2022/0277838 A1 Sep. 1, 2022

(51) Int. Cl.
*G16H 40/20* (2018.01)
*G06N 20/20* (2019.01)
(Continued)

(52) U.S. Cl.
CPC ............. *G16H 40/20* (2018.01); *G06N 20/20* (2019.01); *G16H 20/10* (2018.01); *G16H 50/70* (2018.01)

(58) Field of Classification Search
CPC ........ G16H 40/20; G16H 50/70; G16H 20/10; G06N 20/20
See application file for complete search history.

(56) References Cited

U.S. PATENT DOCUMENTS

| 4,551,133 A | 11/1985 | Zegers de Beyl et al. |
| 4,693,804 A | 9/1987 | Serwer |

(Continued)

FOREIGN PATENT DOCUMENTS

| AU | 2017 279 693 A1 | 1/2018 |
| AU | 2018335288 B2 | 8/2023 |

(Continued)

OTHER PUBLICATIONS

Svendsen, K., et al. "Choosing the Unit of Measurement Counts: The Use of Oral Morphine Equivalents in Studies of Opioid Consumption Is a Useful Addition to Defined Daily Doses." Palliative Medicine, vol. 25, No. 7, Oct. 2011, pp. 725-732. DOI.org (Crossref), https://doi.org/10.1177/0269216311398300. (Year: 2011).*

(Continued)

*Primary Examiner* — Jason S Tiedeman
*Assistant Examiner* — Jonathan C Edouard
(74) *Attorney, Agent, or Firm* — Mintz Levin Cohn Ferris Glovsky and Popeo, P.C.

(57) ABSTRACT

A method may include receiving a first transaction record indicating a first interaction with a first raw quantity of a first medication and a second transaction record indicating a second interaction with a second raw quantity of a second medication. The first transaction record and the second transaction record may be normalized by generating, based on an equivalent unit, a first normalized quantity of the first medication and a second normalized quantity of the second medication. A machine learning model may be applied to the normalized first transaction record and second transaction record to detect, based on the first transaction record and the second transaction record, an anomalous behavior. An investigative workflow may be triggered in response to the machine learning model detecting the anomalous behavior.

(Continued)

Related systems and articles of manufacture, including computer program products, are also provided.

18 Claims, 8 Drawing Sheets

(51) Int. Cl.
   *G16H 20/10* (2018.01)
   *G16H 50/70* (2018.01)

(56) References Cited

U.S. PATENT DOCUMENTS

| | | | |
|---|---|---|---|
| 5,945,651 A | 8/1999 | Chorosinski et al. | |
| 5,961,036 A | 10/1999 | Michael et al. | |
| 5,991,731 A | 11/1999 | Colon et al. | |
| 6,113,578 A | 9/2000 | Brown | |
| 6,650,964 B2 | 11/2003 | Spano, Jr. et al. | |
| 6,671,579 B2 | 12/2003 | Spano, Jr. et al. | |
| 6,842,736 B1 | 1/2005 | Brzozowski | |
| 6,868,344 B1 | 3/2005 | Nelson | |
| 7,119,689 B2 | 10/2006 | Mallett et al. | |
| 7,184,897 B2 | 2/2007 | Nelson | |
| 7,275,645 B2 | 10/2007 | Mallett et al. | |
| 7,303,081 B2 | 12/2007 | Mallett et al. | |
| 7,311,207 B2 | 12/2007 | Mallett et al. | |
| 7,318,529 B2 | 1/2008 | Mallett et al. | |
| 7,562,025 B2 | 7/2009 | Mallett et al. | |
| 7,693,603 B2 | 4/2010 | Higham | |
| 8,147,479 B1 | 4/2012 | Wach et al. | |
| 8,195,328 B2 | 6/2012 | Mallett et al. | |
| 8,280,550 B2 | 10/2012 | Levy et al. | |
| 8,319,669 B2 | 11/2012 | Weller | |
| 8,357,114 B2 | 1/2013 | Poutiatine et al. | |
| 8,595,021 B2 | 11/2013 | Mallett et al. | |
| 8,606,596 B1 | 12/2013 | Bochenko et al. | |
| 8,725,532 B1 | 5/2014 | Ringold | |
| 8,738,177 B2 | 5/2014 | van Ooyen et al. | |
| 8,768,724 B2 | 7/2014 | Whiddon et al. | |
| 8,905,964 B2 | 12/2014 | Poutiatine et al. | |
| 9,056,165 B2 | 6/2015 | Steil et al. | |
| 9,158,892 B2 | 10/2015 | Levy et al. | |
| 9,202,052 B1 | 12/2015 | Fang et al. | |
| 9,227,025 B2 | 1/2016 | Butterfield et al. | |
| 9,354,178 B2 | 5/2016 | Lee | |
| 9,427,520 B2 | 8/2016 | Batch et al. | |
| 9,456,958 B2 | 10/2016 | Reddy et al. | |
| 9,523,635 B2 | 12/2016 | Tilden | |
| 9,636,273 B1 | 5/2017 | Harris | |
| 9,752,935 B2 | 9/2017 | Marquardt et al. | |
| 9,785,744 B2 | 10/2017 | Johnson et al. | |
| 9,796,526 B2 | 10/2017 | Smith et al. | |
| 9,817,850 B2 | 11/2017 | Dubbels et al. | |
| 9,836,485 B2 | 12/2017 | Dubbels et al. | |
| 9,842,196 B2 | 12/2017 | Utech et al. | |
| 9,881,129 B1 | 1/2018 | Cave | |
| 9,958,324 B1 | 5/2018 | Marquardt et al. | |
| 10,032,344 B2 | 7/2018 | Nelson et al. | |
| 10,101,269 B2 | 10/2018 | Judge et al. | |
| 10,187,288 B2 | 1/2019 | Parker et al. | |
| 10,209,176 B2 | 2/2019 | Proskurowski et al. | |
| 10,241,038 B2 | 3/2019 | Nishimura et al. | |
| 10,249,153 B2 | 4/2019 | Nelson et al. | |
| 10,309,832 B2 | 6/2019 | Marquardt et al. | |
| 10,345,242 B2 | 7/2019 | Zhao et al. | |
| 10,515,722 B2 * | 12/2019 | Vahlberg | G07F 9/009 |
| 10,569,015 B2 | 2/2020 | Estes | |
| 10,580,525 B2 | 3/2020 | Adams et al. | |
| 10,832,207 B2 | 11/2020 | Vahlberg et al. | |
| 11,037,666 B1 | 6/2021 | Benoit et al. | |
| 11,116,892 B2 | 9/2021 | Brady et al. | |
| 11,147,914 B2 | 10/2021 | Estes | |
| 11,355,237 B2 | 6/2022 | Vanderveen | |
| 11,481,739 B1 | 10/2022 | McKinzie | |
| 2003/0158751 A1 | 8/2003 | Suresh et al. | |
| 2003/0167190 A1 | 9/2003 | Rincavage et al. | |
| 2005/0277873 A1 | 12/2005 | Stewart et al. | |
| 2006/0064053 A1 | 3/2006 | Bollish et al. | |
| 2007/0260487 A1 | 11/2007 | Bartfeld et al. | |
| 2008/0059226 A1 | 3/2008 | Melker et al. | |
| 2008/0082360 A1 | 4/2008 | Bailey et al. | |
| 2008/0140715 A1 | 6/2008 | Hakos | |
| 2008/0243055 A1 | 10/2008 | Fathallah et al. | |
| 2008/0288430 A1 | 11/2008 | Friedlander et al. | |
| 2008/0306796 A1 | 12/2008 | Zimmerman et al. | |
| 2008/0319795 A1 | 12/2008 | Poteet et al. | |
| 2009/0083231 A1 | 3/2009 | Eberholst et al. | |
| 2009/0160646 A1 | 6/2009 | Mackenzie et al. | |
| 2010/0169063 A1 | 7/2010 | Yudkovitch et al. | |
| 2010/0213250 A1 | 8/2010 | Mallett et al. | |
| 2010/0271218 A1 | 10/2010 | Hoag et al. | |
| 2011/0016110 A1 | 1/2011 | Egi et al. | |
| 2011/0082440 A1 | 4/2011 | Kimmo et al. | |
| 2011/0161108 A1 | 6/2011 | Miller et al. | |
| 2011/0288886 A1 * | 11/2011 | Whiddon | G16H 80/00 |
| | | | 705/3 |
| 2012/0173440 A1 | 7/2012 | Dehlinger et al. | |
| 2012/0226447 A1 | 9/2012 | Nelson et al. | |
| 2012/0265336 A1 | 10/2012 | Mallett et al. | |
| 2012/0305132 A1 | 12/2012 | Maness | |
| 2012/0325330 A1 | 12/2012 | Prince et al. | |
| 2013/0002429 A1 | 1/2013 | Johnson | |
| 2013/0018356 A1 | 1/2013 | Prince et al. | |
| 2013/0070090 A1 | 3/2013 | Bufalini et al. | |
| 2013/0144254 A1 | 6/2013 | Amirouche et al. | |
| 2013/0158705 A1 | 6/2013 | Levy et al. | |
| 2013/0253291 A1 | 9/2013 | Dixon et al. | |
| 2013/0253700 A1 | 9/2013 | Carson et al. | |
| 2013/0262138 A1 | 10/2013 | Jaskela et al. | |
| 2013/0282392 A1 | 10/2013 | Wurm | |
| 2013/0325727 A1 | 12/2013 | MacDonell et al. | |
| 2014/0074284 A1 | 3/2014 | Czaplewski et al. | |
| 2014/0081652 A1 | 3/2014 | Klindworth | |
| 2014/0149131 A1 | 5/2014 | Bear et al. | |
| 2014/0249776 A1 | 9/2014 | King et al. | |
| 2014/0277707 A1 | 9/2014 | Akdogan et al. | |
| 2014/0375324 A1 | 12/2014 | Matsiev et al. | |
| 2015/0038898 A1 | 2/2015 | Palmer et al. | |
| 2015/0061832 A1 | 3/2015 | Pavlovic et al. | |
| 2015/0081324 A1 | 3/2015 | Adjaoute | |
| 2015/0109437 A1 | 4/2015 | Yang et al. | |
| 2015/0161558 A1 | 6/2015 | Gitchell et al. | |
| 2015/0221086 A1 | 8/2015 | Bertram | |
| 2015/0272825 A1 | 10/2015 | Lim et al. | |
| 2015/0286783 A1 | 10/2015 | Kumar et al. | |
| 2015/0294079 A1 | 10/2015 | Bergougnan | |
| 2015/0323369 A1 | 11/2015 | Marquardt | |
| 2015/0339456 A1 * | 11/2015 | Sprintz | G16H 50/30 |
| | | | 705/3 |
| 2015/0362350 A1 | 12/2015 | Miller et al. | |
| 2016/0034274 A1 | 2/2016 | Diao et al. | |
| 2016/0062371 A1 | 3/2016 | Davidian et al. | |
| 2016/0117478 A1 | 4/2016 | Hanina et al. | |
| 2016/0132649 A1 | 5/2016 | Gitchell et al. | |
| 2016/0161705 A1 | 6/2016 | Marquardt et al. | |
| 2016/0166766 A1 | 6/2016 | Schuster et al. | |
| 2016/0259904 A1 | 9/2016 | Wilson | |
| 2016/0259911 A1 | 9/2016 | Koester | |
| 2016/0283691 A1 | 9/2016 | Ali | |
| 2016/0346469 A1 | 12/2016 | Shubinsky et al. | |
| 2017/0017760 A1 | 1/2017 | Freese et al. | |
| 2017/0032102 A1 | 2/2017 | Skoda | |
| 2017/0076065 A1 | 3/2017 | Darr et al. | |
| 2017/0083681 A1 | 3/2017 | Sprintz et al. | |
| 2017/0103203 A1 | 4/2017 | Sharma et al. | |
| 2017/0108480 A1 | 4/2017 | Clark et al. | |
| 2017/0109480 A1 | 4/2017 | Vahlberg | |
| 2017/0109497 A1 * | 4/2017 | Tribble | G06F 16/24578 |
| 2017/0120035 A1 | 5/2017 | Butterfield et al. | |
| 2017/0199983 A1 | 7/2017 | Cano et al. | |
| 2018/0028408 A1 | 2/2018 | Li et al. | |
| 2018/0039736 A1 * | 2/2018 | Williams | G16H 10/60 |
| 2018/0046651 A1 | 2/2018 | Dubbels et al. | |
| 2018/0157803 A1 | 6/2018 | Mirov | |

(56) References Cited

U.S. PATENT DOCUMENTS

| | | |
|---|---|---|
| 2018/0165417 A1 | 6/2018 | Hall et al. |
| 2018/0192942 A1 | 7/2018 | Clark et al. |
| 2018/0203978 A1 | 7/2018 | Basu et al. |
| 2018/0231415 A1 | 8/2018 | Marquardt et al. |
| 2018/0247703 A1* | 8/2018 | D'Amato ............... G16H 10/60 |
| 2018/0259446 A1 | 9/2018 | Coffey et al. |
| 2018/0299375 A1 | 10/2018 | Young et al. |
| 2018/0330824 A1 | 11/2018 | Athey et al. |
| 2018/0365385 A1 | 12/2018 | Cooney et al. |
| 2018/0365386 A1 | 12/2018 | Vanderveen |
| 2019/0088354 A1 | 3/2019 | Yanowitz et al. |
| 2019/0117883 A1 | 4/2019 | Abrams et al. |
| 2019/0124118 A1 | 4/2019 | Swafford |
| 2019/0139638 A1 | 5/2019 | Keefe et al. |
| 2019/0180862 A1 | 6/2019 | Wisser et al. |
| 2019/0206540 A1 | 7/2019 | Agassi et al. |
| 2019/0244699 A1* | 8/2019 | Loebig ................... G16H 20/13 |
| 2019/0247703 A1 | 8/2019 | Welde et al. |
| 2019/0341142 A1* | 11/2019 | Nag ........................ G06Q 50/22 |
| 2019/0355461 A1* | 11/2019 | Kumar ................... G16H 10/60 |
| 2019/0369580 A1 | 12/2019 | Garg et al. |
| 2020/0051363 A1 | 2/2020 | Garg et al. |
| 2020/0085686 A1 | 3/2020 | Aliakbarian et al. |
| 2020/0098474 A1 | 3/2020 | Vanderveen |
| 2020/0219611 A1 | 7/2020 | Nag et al. |
| 2020/0222627 A1 | 7/2020 | Guerra et al. |
| 2020/0230316 A1 | 7/2020 | Guerra et al. |
| 2020/0312442 A1 | 10/2020 | Hairr et al. |
| 2020/0402632 A1 | 12/2020 | van Schelven et al. |
| 2021/0005324 A1* | 1/2021 | Bostic .................... G16H 50/20 |
| 2021/0027259 A1 | 1/2021 | Burgess et al. |
| 2021/0133201 A1 | 5/2021 | Tribble et al. |
| 2021/0249121 A1 | 8/2021 | Burgess et al. |
| 2021/0308385 A1 | 10/2021 | Nisha et al. |
| 2022/0005574 A1 | 1/2022 | Kühn |
| 2022/0062964 A1 | 3/2022 | VanDerWoude et al. |
| 2022/0093239 A1 | 3/2022 | Nag et al. |
| 2022/0254470 A1 | 8/2022 | Lafauci et al. |

FOREIGN PATENT DOCUMENTS

| | | |
|---|---|---|
| CA | 2561239 C | 2/2010 |
| CA | 2 636 115 C | 6/2014 |
| CA | 2 848 274 C | 9/2016 |
| CN | 106687960 A | 5/2017 |
| CN | 110265108 A | 9/2019 |
| EP | 1 973 593 B1 | 4/2013 |
| EP | 1 593 076 B1 | 10/2019 |
| JP | 2007-304654 A | 11/2007 |
| JP | 2016-517077 A | 6/2016 |
| JP | 2018-181340 A | 11/2018 |
| KR | 10-2014-0129141 A | 11/2014 |
| WO | WO-2006/034367 A2 | 3/2006 |
| WO | WO-2010/058796 A1 | 5/2010 |
| WO | WO-2011/014517 A1 | 2/2011 |
| WO | WO-2011/035277 A1 | 3/2011 |
| WO | WO-2011/039676 A2 | 4/2011 |
| WO | WO-2014/055925 A1 | 4/2014 |
| WO | WO-2015/187682 A1 | 12/2015 |
| WO | WO-2019/028004 A1 | 2/2019 |
| WO | WO-2019/031331 A1 | 2/2019 |
| WO | WO-2020163465 A1 * | 8/2020 ........... H04L 9/3231 |
| WO | WO-2020/206154 A1 | 10/2020 |
| WO | WO-2020251962 A1 * | 12/2020 ......... G06Q 10/0637 |

OTHER PUBLICATIONS

Benjamin, X.C. et al. (2012). "Visual identification of medicine boxes using features matching." *IEEE International Conference on Virtual Environments Human-Computer Interfaces and Measurement Systems (VECIMS) Proceedings*, 43-47. Doi: 10.1109/VECIMS.2012.6273190.

Cakaloglu, T. (Nov. 1, 2017). "Medi-Deep: Deep control in a medication usage." *2017 IEEE International Conference of Bioinfomratice and Biomedicine (BIBM)*, 899-904. Doi: 10.1109/BIBM.2017.8217776.

Neuman, M.R. et al. (May 13, 2012), "Advances in Medical Devices and Medical Electronics," in Proceedings of the IEEE, vol. 100, no. Special Centennial Issue, pp. 1537-1550, doi: 10.1109/JPROC.2012.2190684.

Qui et al. (2016) "A survey of machine learning for big data processing." *EURASIP Journal on Advances in Signal Processing*, Article No. 67, 16 pages.

Shishvan, O. Rajabi et al. (2018). "Machine Intelligence in Healthcare and Medical Cyber Physical Systems: A Survey." *IEEE Access*. vol. 6, 46419-46494. doi: 10.1109/ACCESS.2018.2866049.

Uniyal, D. et al. (Nov. 7, 2014), "Pervasive Healthcare—A Comprehensive Survey of Tools and Techniques," arXiv:1411.1821v1, 48 pages.

Yang, J., McAuley, J.J., & Leskovec, J. (2013). "Community Detection in Networks with Node Attributes." 2013 IEEE 13th International Conference on Data Mining, 1151-1156.

Yaniv, Z. et al. (Oct. 1, 2016). "The National Library of Medicine Pill Image Recognition Challenge: An Initial Report." Oct. 2016 *IEEE Applied Imagery Pattern Recognition Workshop, (AIPR)*, 1-9. Doi: 10.1109/AIPR.2016.8010584.

Zhan, A. et al. (Jan. 5, 2016) "High Frequency Remote Monitoring of Parkinson's Disease via Smartphone: Platform Overview and Medication Response Detection," Retrieved Apr. 29, 2021. 12 pages.

Mdukaza, S. et al. (Oct. 2018). "Analysis of IoT-enabled Solutions in Smart Waste Management." In IECON 2018-44th annual conference of the IEEE industrial electronics society, Washington, DC, USA, pp. 4639-4644. IEEE. doi: 10.1109/IECON.2018.8591236.

* cited by examiner

DOSAGE NORMALIZATION FOR DETECTION OF ANOMALOUS BEHAVIOR

TECHNICAL FIELD

The subject matter described herein relates generally to machine learning and more specifically to dosage normalization for machine learning based detection of anomalous behavior.

BACKGROUND

Diversion may refer to the transfer of a controlled substance to a third party who is not legally authorized to receive, possess, and/or consume the controlled substance. High-value and/or controlled prescription medications, notably opioids, may be especially prone to diversion. For example, a prescription pain medication may be diverted when a clinician keeps the prescription pain medication for unauthorized personal use instead of administering the prescription pain medication to a patient or wasting the prescription pain medication.

The medical environment and certain clinical workflows may present opportunities for diversion. For example, prescription pain medications may be diverted while being loaded into and/or retrieved from a dispensing cabinet. Some prescription pain medications, such as morphine, hydromorphone, fentanyl, and/or the like, may be administered to a patient via a pump such as, for example, a patient-controlled analgesic (PCA) pump, that is capable of holding more doses of the pain medication than is needed by the patient. These extra doses of pain medication may be susceptible to being diverted by the clinicians tending the patient. For instance, some of the pain medication may be removed before being loaded into the pump while unused pain medication that remains in the pump may be held back instead of properly disposed of at a wasting site.

SUMMARY

Systems, methods, and articles of manufacture, including computer program products, are provided for detecting anomalous behavior. In one aspect, there is provided a system. The system may include at least one data processor and at least one memory. The at least one memory may store instructions that result in operations when executed by the at least one data processor. The operations may include: receiving, from one or more data systems, a first transaction record indicating a first interaction with a first raw quantity of a first medication and a second transaction record indicating a second interaction with a second raw quantity of a second medication; normalizing the first transaction record and the second transaction record, the normalizing including generating, based at least on an equivalent unit, a first normalized quantity of the first medication and a second normalized quantity of the second medication; applying, to the normalized first transaction record and the normalized second transaction record, a first machine learning model trained to detect, based at least on the first transaction record and the second transaction record, an anomalous behavior; and in response to the first machine learning model detecting the anomalous behavior, triggering an investigative workflow at one or more data systems.

In some variations, one or more features disclosed herein including the following features can optionally be included in any feasible combination. The equivalent unit may include a morphine equivalent unit.

In some variations, the first transaction record and the second transaction record may be associated with a first clinician. The first machine learning model may be trained based at least on a third transaction record associated with a second clinician in a same peer community as the first clinician. The third transaction record may be normalized based at least on the equivalent unit.

In some variations, a peer community in a peer network may be identified by at least applying a second machine-learning model trained to identify one or more peer communities present in the peer network. The peer network may include a plurality of clinicians. The peer community may include the first clinician and the second clinician from the plurality of clinicians based at least on the first clinician and the second clinician sharing at least one common attribute.

In some variations, the anomalous behavior may be detected based at least on the first normalized quantity and/or the second normalized quantity deviating from a norm for the peer community.

In some variations, the anomalous behavior may be detected based at least on a potency of the first medication and/or the second medication deviating from a norm for the peer community.

In some variations, the anomalous behavior may be detected based at least on a frequency of the first interaction with the first medication and/or the second interaction with the second medication deviating from a norm for the peer community.

In some variations, the at least one common attribute may include one or more of a patient, a medical device, a prescription order, a clinician role, a shift, a supervisor, an educational background, training, an assigned care area, a medical protocol, and a physical layout of a facility.

In some variations, the second machine learning model may include a neural network, a minimum cut, a hierarchical clustering, a Girvan-Newman algorithm, a modularity maximization, and/or a clique detection.

In some variations, the first machine learning model may include a regression model, an instance-based model, a regularization model, a decision tree, a Bayesian model, a clustering model, an associative model, a neural network, a deep learning model, a dimensionality reduction model, and/or an ensemble model.

In some variations, the first interaction may include one or more of a prescription, a dispensing, an administration, and/or a wasting of the first medication. The second interaction may include one or more of a prescription, a dispensing, an administration, and/or a wasting of the second medication.

In some variations, the investigative workflow may include sending, to a client, an alert identifying one or more clinicians exhibiting the anomalous behavior.

In some variations, the investigative workflow may include activating one or more surveillance devices in response to one or more clinician associated with the anomalous behavior accessing the one or more data systems.

In some variations, the anomalous behavior may include a diversion of medication, an overmedication, and/or an undermedication.

In some variations, the one or more data systems may include an access control system, a dispensing system, and/or an electronic medical record (EMR) system.

In another aspect, there is provided a method for detecting anomalous behavior. The method may include: receiving, from one or more data systems, a first transaction record indicating a first interaction with a first raw quantity of a first medication and a second transaction record indicating a second interaction with a second raw quantity of a second medication; normalizing the first transaction record and the second transaction record, the normalizing including generating, based at least on an equivalent unit, a first normalized quantity of the first medication and a second normalized quantity of the second medication; applying, to the normalized first transaction record and the normalized second transaction record, a first machine learning model trained to detect, based at least on the first transaction record and the second transaction record, an anomalous behavior; and in response to the first machine learning model detecting the anomalous behavior, triggering an investigative workflow at one or more data systems.

In some variations, one or more features disclosed herein including the following features can optionally be included in any feasible combination. The equivalent unit may include a morphine equivalent unit.

In some variations, the first transaction record and the second transaction record may be associated with a first clinician. The first machine learning model may be trained based at least on a third transaction record associated with a second clinician in a same peer community as the first clinician. The third transaction record may be normalized based at least on the equivalent unit. A peer community in a peer network may be identified by at least applying a second machine-learning model trained to identify one or more peer communities present in the peer network. The peer network may include a plurality of clinicians. The peer community may include the first clinician and the second clinician from the plurality of clinicians based at least on the first clinician and the second clinician sharing at least one common attribute.

In some variations, the anomalous behavior may be detected based on at least one of the first normalized quantity and/or the second normalized quantity deviating from a norm for the peer community, a potency of the first medication and/or the second medication deviating from the norm for the peer community, and a frequency of the first interaction with the first medication and/or the second interaction with the second medication deviating from the norm for the peer community.

In another aspect, there is provided a non-transitory computer readable medium that stores instructions. The instructions may cause operations when executed by at least one data processor. The operations may include: receiving, from one or more data systems, a first transaction record indicating a first interaction with a first raw quantity of a first medication and a second transaction record indicating a second interaction with a second raw quantity of a second medication; normalizing the first transaction record and the second transaction record, the normalizing including generating, based at least on an equivalent unit, a first normalized quantity of the first medication and a second normalized quantity of the second medication; applying, to the normalized first transaction record and the normalized second transaction record, a machine learning model trained to detect, based at least on the first transaction record and the second transaction record, an anomalous behavior; and in response to the machine learning model detecting the anomalous behavior, triggering an investigative workflow at one or more data systems.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to detecting anomalous behavior, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
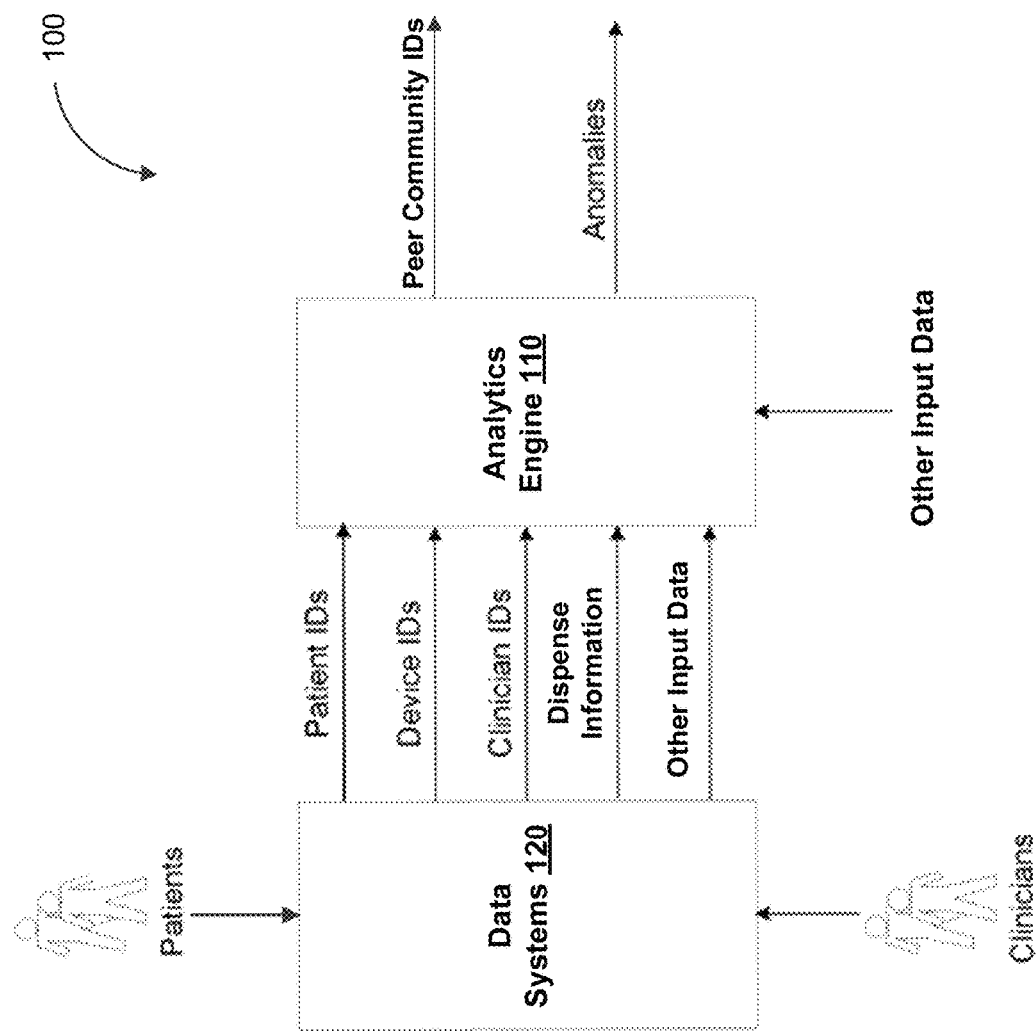
FIG. 1 depicts a block diagram illustrating a tracking system, in accordance with some example embodiments.

Diversion of a medication may occur at any point during the handling of the medication including, for example, during the shipping, receiving, stocking, prescribing, dispensing, administration, and/or wasting of the medication. Prescription pain medications may be especially prone to diversion due to a lack of sufficient custodial oversight during, for instance, the shipping, receiving, stocking, prescribing, dispensing, administration, and/or wasting of the prescription pain medication. For example, dispensing cabinets at medical facilities may be accessible to multiple clinicians. Moreover, different clinicians may be responsible for the prescription, dispensing, administration, and wasting of the medication. Thus, even when diversion is detected, it may be difficult to determine when the diversion actually occurred and identify the clinicians responsible for the diversion.

In some example embodiments, an analytics engine may detect anomalous behavior indicative of diversion, medical error, and/or the like including by identifying clinicians who exhibit anomalous behavior. For example, the analytics engine may determine that a clinician exhibits anomalous behavior by at least comparing the transaction records associated with the clinician against the transaction records of one or more other clinicians. The clinician may be determined to exhibit anomalous behavior if, for example, the transaction records associated with the clinician manifest activity patterns inconsistent with the activity patterns present in the transaction records of other clinicians. As used herein, a clinician may refer to a medical personnel having at least some access to a controlled substance including, for example, a doctor, a nurse, a pharmacist, a pharmacy technician, an imaging specialist, and/or the like.

Not all differences in activity patterns may be attributable to illicit acts such as diversion. Instead, some differences in activity patterns may have legitimate causes including, for example, differences in patient condition and medical needs, care areas (e.g., medical-surgical, intensive care, emergency, infusion center, non-acute, outpatient, observation, and/or the like), facilities, tasks, and/or the like. Thus, the analytics engine may be prone to false positives and/or false negatives if the analytics engine compares the transaction records associated with clinicians whose activity patterns (e.g., in the prescription, dispensing, administration, and/or wasting of medications) are dissimilar due to various legitimate causes. For example, due to pharmacological differences between a first pain medication (e.g., Tramadol) and a second pain medication (e.g., Fentanyl), the first pain medication may require a higher dosage to achieve a comparable clinical effect as the second pain medication. For example, the first pain medication and the second pain medication may require different dosages due to differences in potency, form factor (e.g., tablet, patches, liquid), delivery mechanism (e.g., ingestion, infusion), and/or the like. As such, a first clinician who administers the first pain medication (e.g., Tramadol) may exhibit a markedly different activity pattern than a second clinician who administers the second pain medication (e.g., Fentanyl) because the dosage discrepancies between the first pain medication and the second pain medication may gave rise to the false observation that the first clinician is prescribing, dispensing, administering, and/or wasting medication in anomalous quantities and/or at anomalous frequencies.

In some example embodiments, instead of comparing the transaction records of different clinicians indiscriminately, the analytics engine may be configured to identify one or more peer communities of clinicians. Each peer community may be occupied by clinicians sharing sufficiently similar attributes such that the clinicians in the same peer community should also exhibit the same and/or similar activity patterns. Accordingly, to determine whether a clinician exhibits anomalous behavior, the analytics engine may compare the transaction records associated with the clinician against the transaction records of other clinicians within the same peer community. Moreover, the analytics engine may normalize raw quantities of different medications included in the transaction records in order to eliminate dosage discrepancies introduced by pharmacological differences (e.g., in potency, form factor, delivery mechanism, and/or the like) that require the different dosages to achieve a comparable clinical effect.

In the previous example, for instance, the first quantity of the first pain medication (e.g., Tramadol) administered by the first clinician and the second quantity of the second pain medication (e.g., Fentanyl) administered by the second clinician may be normalized into a morphine equivalent unit such as milligram morphine equivalents (MME). Normalizing raw quantities of the first pain medication and the second pain medication may eliminate dosage discrepancies introduced by pharmacological differences (e.g., in potency, form factor, delivery mechanism, and/or the like) that require the first pain medication and the second pain medication to be administered in different dosages. Moreover, trends in the prescribed, dispensed, administered, and/or wasted quantities of the first pain medication and the second pain medication may be more apparent in when the raw quantities are normalized into a morphine equivalent unit such as milligram morphine equivalents (MME). Such trends may be indicative of anomalous behavior, for example, because abuse and diversion of pain medication, especially opioid pain medication, tend to escalate over time as chronic usage gives rise to tolerance and a need for more potent and/or larger quantities of pain medication.

In some example embodiments, the analytics engine may apply a machine learning model such as, for example, a neural network, trained to identify one or more peer communities of clinicians. Peer communities of clinicians may also be identified by applying alternate techniques including, for example, minimum cut, hierarchical clustering, Girvan-Newman, modularity maximization, clique detection, and/or the like. The one or more peer communities of clinicians may be identified based on attributes that are highly correlated with activity patterns. For example, the peer communities of clinicians may be identified based on the patients or types of patients treated by each clinicians because clinicians who treat the same patients or types of patients should also exhibit the same and/or similar activity patterns. This may be due to the fact that clinicians who treat the same patients and/or types of patients tend to perform same and/or similar procedures. Alternatively and/or additionally, the peer communities of clinicians may be identified based on interactions with one or more medical devices such as, for example, dispensing cabinets, infusion pumps, wasting stations, and/or the like, as well as the corresponding processes and workflows.

The location of medical devices may impose a geographical constraint on membership in each peer community because clinicians operating in close proximity (e.g., in the same care area and/or the like) should exhibit the same and/or similar activity patterns. Nevertheless, it should be appreciated that an attribute and/or combination of attributes directly or indirectly detectable by the analytics engine may be used to identify different peer communities of clinicians. For example, peer communities may also be identified based on same and/or similar prescription orders, clinician roles, shifts, supervisors, educational background, training, assigned care areas, relevant medical protocols, physical layout of facilities and/or the like. Alternatively and/or additionally, communities may be identified based on treatment of patients progressing through a common course of care within or across care areas including, for example, transitions between two common care areas, patient's duration within a care area, timing between care area transitions, and/or the like. It should be appreciated that membership in the peer communities may remain dynamic as the attributes associated with each clinician may change over time. For instance, a clinician may be added to and/or removed from a peer community when the clinician starts or stops treating a particular patient.

In some example embodiments, the analytics engine may determine that a clinician exhibits anomalous behavior if a comparison of the transaction records associated with the clinician indicates that the activity pattern of the clinician deviates from the activity patterns of other clinicians in a same peer community. Normalizing quantities of different medications, such as quantities of different pain medications to a morphine equivalent unit (e.g., milligram morphine equivalents (MME) and/or the like), may enable a meaningful comparison between the activity patterns of clinicians who interact with the medications. Referring again to the previous example, a norm for the peer community including the first clinician and the second clinician may be established based on the morphine equivalent unit. As such, the first clinician and/or the second clinician may be identified as exhibiting anomalous behavior, such as diversion, medical error (e.g., improper dosage such as overmedication and undermedication), and/or the like, if the first quantity of the first pain medication administered by the first clinician and/or the second quantity of the second pain medication administered by the second clinician, when normalized to the morphine equivalent unit, deviate from the norm for the peer community.

FIG. 1 depicts a system diagram illustrating a tracking system 100, in accordance with some example embodiments. Referring to FIG. 1, the tracking system 100 may include an analytics engine 110, which may be communicatively coupled with one or more data systems 120. Examples of the one or more data systems 120 may include medical devices such as dispensing cabinets, infusion pumps, and wasting stations. As shown in FIG. 1, the one or more data systems 120 may collect data that arise from clinicians interacting with the one or more data systems 120 including, for example, patient identifiers, devices identifiers, clinician identifiers, and/or the like.

The one or more data systems 120 may, in response to one or more interactions with a clinician, generate a transaction record corresponding to the one or more interactions. For example, a clinician dispensing a medication from a dispensing cabinet may trigger the generation of a transaction record that includes a timestamp, a clinician identifier of the clinician, a device identifier of the dispensing cabinet, a patient identifier of a patient prescribed the medication, an identifier of the medication retrieved from the dispensing cabinet, a quantity of the medication retrieved from the medication cabinet, a location identifier, and/or the like. An example dispensing cabinet is described in U.S. Pat. No. 8,195,328, which is commonly owned and hereby incorporated by reference in its entirety.

Alternatively and/or additionally, a clinician using an infusion pump to administer a medication to a patient may trigger the generation of a transaction record that includes a timestamp, a clinician identifier of the clinician, a device identifier of the infusion pump, a patient identifier of the patient receiving the medication, an identifier of the medication being administered to the patient, a quantity of the medication being administered to the patient, a location identifier, and/or the like. One example of an infusion pump is described in U.S. Pat. No. 9,227,025, which is commonly owned and hereby incorporated by reference in its entirety. It should be appreciated that the one or more data systems 120 may also provide non-transactional data. For example, the one or more data systems 120 may generate one or more electronic medical records (EMRs) that provides a patient's medical history including, for example, past opioid use and/or the like. While an interaction with the one or more data systems 120 to create, update, and/or retrieve an electronic medical record may generate a transaction record including a timestamp of the interaction, the electronic medical record itself is not a transaction record.

The analytics engine 110 may receive, from the one or more data systems 120, a plurality of input data including, for example, patient identifiers, devices identifiers, clinician identifiers, medication identifiers, quantities of medication, prescription order identifiers, inventory information, shift identifiers, location tracking identifiers, electronic health record (EHR) identifiers, and/or the like. It should be appreciated that the input data from the one or more data systems 120 may include at least a portion of the transaction records that are generated in response to interactions with different clinicians. Moreover, the input data from the one or more data systems 120 may correspond to attributes that may be used to identify communities of clinicians.

Accordingly, in some example embodiments, the analytics engine 110 may determine, based at least on the input data received from the one or more data systems 120, peer communities of clinicians, each of which being associated with a peer community identifier. Clinicians in the same peer community may be associated with sufficiently similar attributes such that the clinicians in the same peer community should also exhibit the same and/or similar activity patterns. Contrastingly, clinicians in different peer communities may be associated with different attributes that give rise to legitimate deviations in the activity patterns of the clinicians in different peer communities.

For example, the analytics engine 110 may identify, based at least on the input data received from the one or more data systems 120, peer communities of clinicians who treat the same patients. Alternatively and/or additionally, the analytics engine 110 may identify, based at least on the input data received from the one or more data systems 120, peer communities of clinicians who interact with the same medical devices and/or medical devices in a same care area.

As used herein, a care area may refer to an area in a specific medical facility that is designated based on function and/or location. For instance, a facility such as a hospital may include a plurality of care areas such as, for example, medical-surgical, intensive care, emergency, observation, non-acute, infusion center, outpatient, and/or the like. It should be appreciated that the condition of a patient may be inferred based at least on the care area occupied by the patient. The condition of a patient may also be inferred based on the medication being administered to the patient. Clinicians treating patients with in the same and/or similar conditions should exhibit the same and/or similar activity patterns. As such, in addition to a geographical constraint, the location of medical devices being within a certain care unit may further refine membership in each peer community based on the condition of the patients that are being treated by the clinicians in each peer community.

In some example embodiments, the one or more rooms and/or beds that are associated with a medical device in a care area may be used when determining peer communities based interactions with the medical device. This refinement may be applied when a single medical device, such as a dispensing cabinet or a wasting station, is shared amongst multiple care areas. For example, a single medical device may be located between two different care areas, which can be differentiated based on the rooms and/or beds associated with each care area. When that is the case, each care area may be defined based on the rooms and/or beds associated with the care area. Alternatively and/or additionally, different care areas may be differentiated based on a care area identifier or care area designation.

As noted, clinicians in the same peer community should exhibit the same and/or similar activity patterns while clinicians in different peer communities may exhibit different activity patterns. Such similarities as well as disparities may be attributable to a variety of underlying causes. For example, the same patients and/or patients in the same care area may exhibit the same and/or similar needs for medication. Accordingly, the activity patterns of clinicians treating the same patients and/or operating in the same care area should be the same and/or similar in terms of the types and/or the quantities of the medication that each clinician retrieves from a dispensing cabinet, administers through an infusion pump, and/or disposes of at a wasting station.

Alternatively and/or additionally, a same and/or similar treatment protocol may apply to the same patients and/or patients in the same care area. For instance, clinicians in one care area may be permitted to administer multiple doses of a medication before disposing unused medication at a wasting station whereas clinicians in another care area may only be permitted to administer a single dose of the medication before the unused medication are disposed of at a wasting station. The activity patterns of clinicians treating the same patients and/or operating in the same care area may therefore also reflect the corresponding treatment protocol. Furthermore, the design of a care area (e.g., layout, quantity of available medical devices, and/or the like) may give rise to similarities in the activity patterns of clinicians operating in that care area. For example, the activity patterns of a clinician operating in the care area may reflect the distance the clinician must travel in order to access a patient and/or a medical device in the care area.

Because clinicians in the same peer community should exhibit the same and/or similar activity patterns, the analytics engine 110 may determine whether a clinician exhibits anomalous behavior by comparing the activity patterns of the clinician to the activity patterns of other clinicians in the same peer community. The activity patterns of the clinician may include a series of transaction records which, as noted, may be generated when the clinician interacts with the one or more data systems 120. Moreover, as noted, each transaction record may include a variety of data including, for example, patient identifiers, devices identifiers, clinician identifiers, medication identifiers, quantities of medication, prescription order identifiers, inventory information, shift identifiers, location tracking identifiers, electronic health record (EHR) identifiers, and/or the like.

In some example embodiments, the transaction records may be normalized to allow a meaningful comparison of the data included in each transaction record. The normalization may be performed by the analytics engine 110 as a pre-processing step or by another entity within the tracking system 100. Moreover, the normalization may be performed according to a standardized messaging format such as a Health Level Seven (HL7) format or other electronic record format. The normalization may be performed enable a comparison between common, analogous, and/or semantically equivalent data originating from different transactions and/or different data systems. One example of normalization may include reconciling analogous data from a first field in a first transaction record generated by a first data system with a different name than a second field in a second transaction record generated by a second data system (e.g., a "PATIENT" field in the first transaction record and a "PATIENT_ID" in the second transaction record). Accordingly, normalization may be used to reconcile medications with different identifiers including, for example, medications with the same or analogous ingredients but different names.

Another example of normalization may include normalizing raw quantities of medication included in each transaction record to enable a meaningful comparison between different medications that must be administered in different quantities to achieve a comparable clinical effect. For instance, due to differences in potency, form factor, and/or delivery mechanism, a first pain medication (e.g., Tramadol) may require a higher dosage to achieve a comparable clinical effect as a second pain medication (e.g., Fentanyl). As such, a first transaction record including a first quantity of the first pain medication and a second transaction record including a second quantity of the second pain medication may be normalized such that the two quantities are measured in a morphine equivalent unit (e.g., milligram morphine equivalents (MME) and/or the like).

The normalization may be performed to enable a meaningful analysis of the activity patterns of a first clinician who administers the first quantity of the first pain medication and a second clinician who administers the second quantity of the second pain medication. Absent the normalization, comparisons based on the raw quantities of different pain medications may gave rise to false negatives or false positives of the first clinician and/or the second clinician administering medication in anomalous quantities and/or at anomalous frequencies. For example, the normalized quantities administered by the first clinician and the second clinician may be analyzed relative to a norm for a peer community including the two clinicians. If the norm for the peer community is n milligram morphine equivalents (MME) of pain medication, then the first clinician may be identified as culpable of diversion or overmedication if the first quantity of the first pain medication administered by the first clinician is more than a threshold above n milligram morphine equivalents. Alternatively, the second clinician may be identified as culpable of undermedication if the second quantity of the second pain medication administered by the second clinician is more than a threshold below n milligram morphine equivalents.

In some example embodiments, a series of transaction records associated with a clinician may be divided temporally to correspond, for example, to the shifts (e.g., time periods of work) associated with the clinician. The analytics engine 110 may determine that the clinician exhibits anomalous behavior if the activity patterns of the clinician deviate from the activity patterns of other clinicians in the same peer community. For example, the analytics engine 110 may assign, to each clinician in the same peer community, a rank corresponding to how much the activity patterns of the clinician deviate from a synthetic norm and/or an expected norm for that peer community. These activity patterns may be normalized based on individual shifts, which are periods of time during which a clinician is on duty, such that the analysis of the activity patterns correctly accounts for those periods of time during which the clinician is not on duty to perform any tasks. The expected norms for the peer community may be determined based on the activity patterns of at least a portion of the clinicians included in the peer community. Alternatively and/or additionally, a synthetic norm for the peer community may be generated based on additional data including, for example, medical protocol, generalized observations, and/or the like. The analytics engine 110 may determine that a clinician exhibits anomalous behavior if the clinician is ranked above or below a threshold value.

The analytics engine 110 may receive other input data that does not originate with the data systems 120. The other input data may include additional signals that can be used to detect peer communities or anomalies. The other input data may include information to trigger assessment of peer communities and behavior. For example, a user interface may be presented to collect configuration parameters and initiate assessment of the information received from the data system 120 by the analytics engine 110. As an alternative or additional example, the other input data may be information from a sensor such as a biometric sensor, camera sensor, temperature sensor, or wireless signal sensor, that detects information associated with a clinician and may be used to identify peer communities or anomalous behavior. For instance, pupil dilation or increased temperature or posture can be indicators of potential drug use.

According to some implementations, the other input data may be received from a time and attendance system. For example, when a clinician clocks out to indicate the end of a shift, the analytics engine 110 may receive a message identifying the clinician clocking out. Because this message may indicate a new batch of transaction may be ready for processing, the analytics engine 110 may initiate one or more of the processes described. The analytics engine 110 may, for instance, assess the transaction records from the current shift and provide a response to the time and attendance system. In this way, the clinician may be presented with a message including positive reinforcement if the transaction records were consistent with best practices (or at least non-divergent). In the event that the clinician's shift included one or more transaction records indicative of anomalous behavior such as diversion or medical error, the message may cause the collection of additional information near in time to the transaction(s) in question. The collection may include initiating an investigation workflow as described. The collection may also include additional information used to identify one or more peer communities for the clinician.

Figure 2:
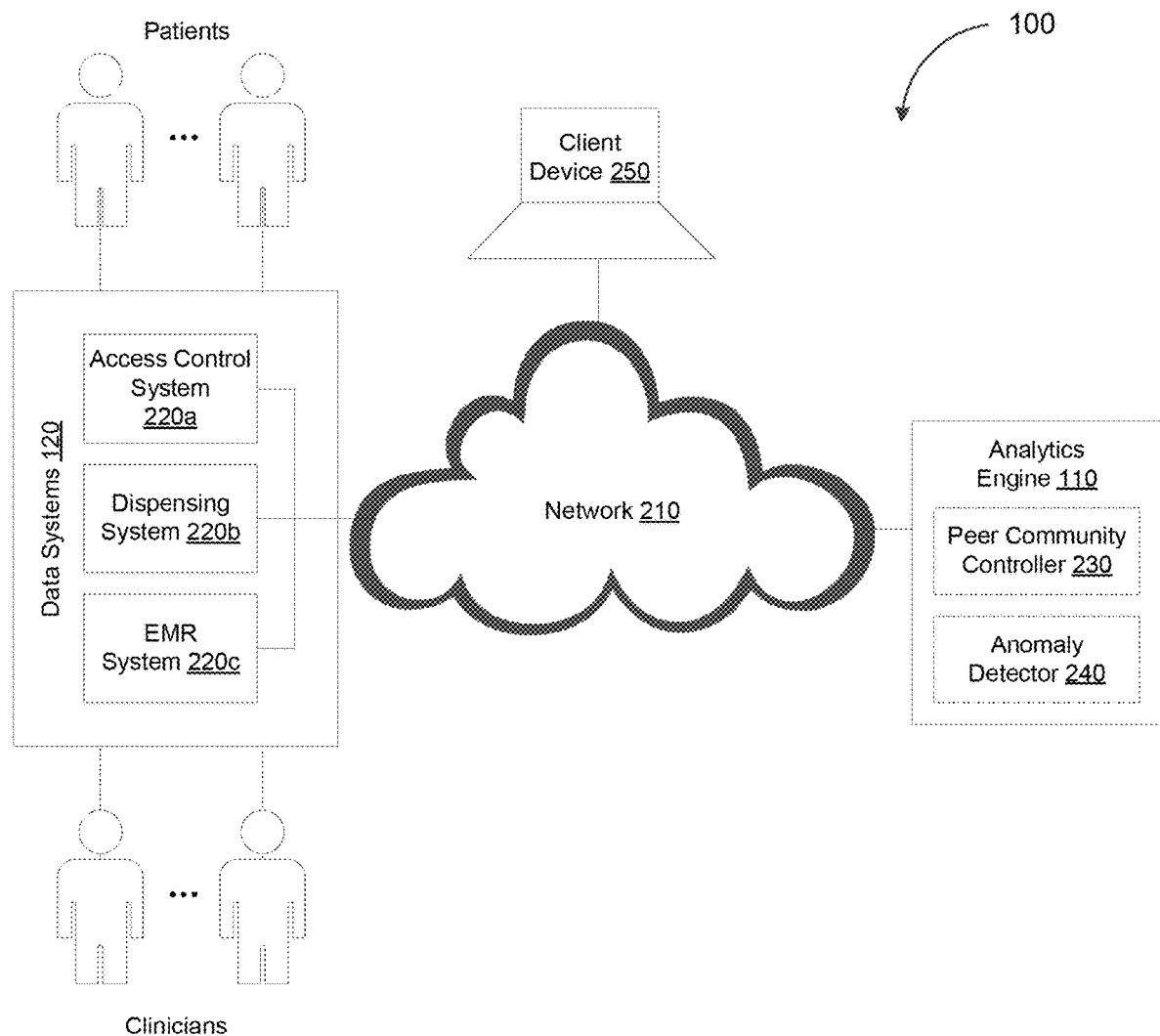
FIG. 2 depicts a system diagram illustrating an example of a clinician tracking system, in accordance with some example embodiments.

FIG. 2 depicts a system diagram illustrating an example of the tracking system 100, in accordance with some example embodiments. As shown in FIG. 2, the analytics engine 110 and the one or more data systems 120 may be communicatively coupled via a network 210. The network 210 may be any wired and/or wireless network including, for example, a public land mobile network (PLMN), a local area network (LAN), a virtual local area network (VLAN), a wide area network (WAN), the Internet, and/or the like.

In the example shown in FIG. 2, the one or more data systems 120 may include an access control system 220a, a dispensing system 220b, and an electronic medical record (EMR) system 220c. As noted, a clinician interacting with the access control system 220a, the dispensing system 220b, and/or the electronic medical record system 220c may trigger the generation of one or more corresponding transaction records. For example, the clinician dispensing a medication from a dispensing cabinet may trigger the generation of a transaction record that includes a timestamp, a clinician identifier of the clinician, a device identifier of the dispensing cabinet, a patient identifier of a patient prescribed the medication, an identifier of the medication retrieved from the dispensing cabinet, a quantity of the medication retrieved from the medication cabinet, and/or the like. Alternatively and/or additionally, a clinician using an infusion pump to administer a medication to a patient may trigger the generation of a transaction record that includes a timestamp, a clinician identifier of the clinician, a device identifier of the infusion pump, a patient identifier of the patient receiving the medication, an identifier of the medication being administered to the patient, a quantity of the medication being administered to the patient, and/or the like.

Referring again to FIG. 2, the analytics engine 110 may include a peer community controller 230 and an anomaly detector 240. As noted, the analytics engine 110 may receive, from the one or more data systems 120, a plurality of input data that include at least a portion of the transaction records generated by the one or more data systems 120 in response to interactions between the one or more data systems 120 and a plurality of different clinicians. Moreover, the input data from the one or more data systems 120 may correspond to attributes that may be used to identify different peer communities of clinicians. Accordingly, the peer community controller 230 may identify, based at least on the input data received from the one or more data systems 120, peer communities of clinicians who should exhibit the same and/or similar activity patterns. For instance, in some example embodiments, the peer community controller 230 may identify, based at least on the input data received from the one or more data systems 120, peer communities of clinicians who treat the same patients. Alternatively and/or additionally, the peer community controller 230 may identify, based at least on the input data received from the one or more data systems 120, peer communities of clinicians who interact with the same medical devices and/or medical devices in a same care area such as, for example, medical-surgical, intensive care, emergency, non-acute, observation, outpatient, infusion center, and/or the like.

In some example embodiments, the anomaly detector 240 may be configured to determine whether a clinician exhibits anomalous behavior by comparing the activity patterns of the clinician to the activity patterns of other clinicians in the same peer community. As noted, the activity patterns of the clinician may include a series of transaction records generated, for example, when the clinician interacts with the one or more data systems 120. Transaction records associated with the prescription, dispensing, administration, and/or wasting of a medication may include a timestamp, an identifier of the medication, and a quantity of the medication dispensed. To identify anomalous behavior such as diversion and medical error, the anomaly detector 240 may normalize the raw quantities of medication included in these transaction records. For example, raw quantities of a pain medication may be normalized to a morphine equivalent unit such as milligram morphine equivalents (MME). Alternatively and/or additionally, the normalization may include normalizing across analogous medication with same or similar ingredients but different identifiers.

Normalizing raw dosages of different pain medications may enable a meaningful comparison between the activity patterns of clinicians who interact with pain medications that are administered in different dosages and/or frequencies due to pharmacological differences such a potency, form factor, and delivery mechanism. For example, administering a low potency pain medication in large quantities and/or at high frequencies may not be indicative of anomalous behavior but administering a high potency pain medication in the same large quantities and/or at the same high frequencies may be indicative of anomalous behavior. The anomaly detector 240 may also detect anomalous behavior, for instance, if a clinician prescribes, dispenses, administers, and/or wastes an excessively large proportion of high potency pain medications relative to the norm for the peer community associated with the clinician, meaning that the clinician may be selectively targeting high potency drugs. Alternatively and/or additionally, the anomaly detector 240 may detect anomalous behavior, in particular an escalation in such behavior, if the clinician prescribes, dispenses, administers, and/or wastes increasingly more potent pain medications and/or increasingly higher normalized quantities of pain medications.

To analyze transaction records for anomalous behavior, a series of transaction records may be divided temporally to correspond, for example, to the shifts associated with the clinician. Moreover, the anomaly detector 240 may determine that the clinician exhibits anomalous behavior if the activity patterns of the clinician deviate from the activity patterns of other clinicians in the same peer community. For example, the clinician may be assigned a rank corresponding to how much the activity patterns of the clinician deviate from the expected norms for the peer community of the clinician. The anomaly detector 240 may determine that a clinician exhibits anomalous behavior if the clinician is ranked above or below a threshold value. The determination may be based on a single behavior score or a combination of scores over a period of time (e.g., average or moving average).

In some example embodiments, the ranking assigned to a clinician may be assessed based on a threshold values or a range of acceptable values, which may be determined dynamically. For example, as the one or more data systems 120 collect more and more data for a specific peer community over time, the threshold value or the range of acceptable values may be updated to reflect changes in the norm for the peer community. Nevertheless, the anomaly detector 240 may impose one or more limits to the threshold value or range of acceptable values in order to prevent an entire peer community of clinicians who uniformly exhibits anomalous behavior from escaping detection. A user interface may be provided, for example, at the client device 250, to receive such configurations for the anomaly detector 240 such as the described threshold values or ranges.

Different quantities pain medications may be normalized, for example, to a morphine equivalent unit such as milligram morphine equivalents (MME), to enable the anomaly detector 240 to detect, based at least on the normalized quantities, activity patterns such as prescribing, dispensing, administering, and/or wasting medication in anomalous quantities and/or at anomalous frequencies. Such activity patterns may be indicative of anomalous behavior including, for example, diversion, medical error (e.g., overmedication, undermedication), and/or the like.

In some example embodiments, the anomaly detector 240 may apply a machine learning model trained to determine, based on one or more transaction records representative of the activity pattern of a clinician, whether the clinician exhibits anomalous behavior. This machine learning model may be trained to perform anomaly detection (or outlier detection) using training data that includes normalized quantities of different pain medications. Examples of machine learning models that may be used to perform anomaly detection (or outlier detection) may include a regression model, an instance-based model, a regularization model, a decision tree, a Bayesian model, a clustering model, an associative model, a neural network, a deep learning model, a dimensionality reduction model, an ensemble model, and/or the like. Moreover, the training data used to train the machine learning model may include transaction records in which the quantities of medication are normalized to a morphine equivalent unit such as milligram morphine equivalents (MME). These transaction records may be representative of anomalous activity patterns and/or non-anomalous activity patterns for clinicians in a same peer group. That is, the machine learning model may be trained based on transaction records associated with clinicians in a same peer group in order to recognize activity patterns that are the norm for that peer group and identify outliers whose activity patterns do not conform to the norm for the peer group.

Because practices and behavior change over time, the system may include specific criteria to identify and initiate retraining of the machine learning model. For example, the system may include a configurable threshold criterion that, once met, causes retraining of the machine learning model. Examples of a threshold criterion include time (e.g., since last training) or number of transactions (e.g., number since last training or average number per clinician). Upon satisfaction of the criterion, the anomaly engine 140 may automatically initiate training or request an input (e.g., through a user interface) to cause retraining of the machine learning model. Further examples of machine learning and modeling features which may be included in the embodiments discussed are described in "A survey of machine learning for big data processing" by Qiu et al. in EURASIP Journal on Advances in Signal Processing (2016) which is hereby incorporated by reference in its entirety.

In some example embodiments, the anomaly detector 240 may respond the identification of a clinician exhibiting anomalous behavior by at least triggering an investigative workflow. The investigative workflow may include the anomaly detector 240 generating an alert identifying the clinician exhibiting anomalous behavior and sending the alert to a client device 250 via the network 210. The alert may indicate, for example, the prescription, dispensing, administration, and/or wasting of an improper quantity of medication, an improper potency medication, and/or the like. Furthermore, the investigative protocol may include the anomaly detector 240 configuring one or more of the data systems 120. For instance, the anomaly detector 240 activate one or more surveillance devices (e.g., video cameras, still image cameras, audio recorders, and/or the like) at a medical device (e.g., dispensing cabinet, infusion pump, wasting station, and/or the like) whenever the clinician accesses the medical device. Alternatively and/or additionally, the anomaly detector 240 may configure the medical device to isolate medication accessed by the clinician. For example, the anomaly detector 240 may activate a surveillance device at a wasting station in response to the clinician accessing the wasting station to dispose of unused medication. Moreover, the anomaly detector 240 may configure the wasting station to isolate the unused medication returned by the clinician, for example, in a designated receptacle that is separate from the receptacles holding unused medication returned by other clinicians.

Figure 3A:
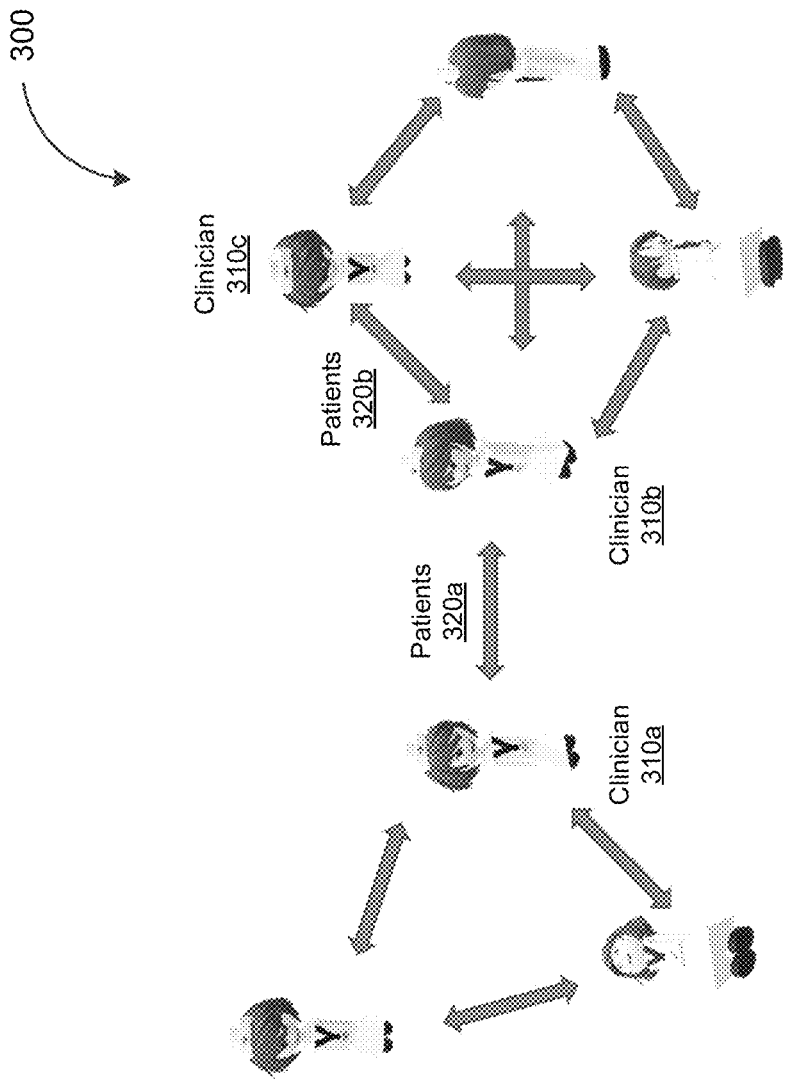
FIG. 3A depicts a graph representative of an example of a peer network, in accordance with some example embodiments.

As noted, the analytics engine 110, for example, the peer community controller 230, may be configured to identify one or more peer communities of clinicians, each of which including clinicians who should exhibit the same and/or similar activity patterns. In some example embodiments, the peer community controller 230 may form, based at least on one or more attributes associated with each clinician, a peer network of clinicians before identifying the peer communities that are present in the peer network. To further illustrate, FIG. 3A depicts a graph representative of a peer network 300, in accordance with some example embodiments. As shown in FIG. 3A, the peer network 300 may include a plurality of nodes connected by a plurality of edges. In some example embodiments, each node in the peer network 300 may correspond to a clinician including, for example, a first clinician 310a, a second clinician 310b, a third clinician 310c, and/or the like. Meanwhile, each edge in the peer network 300 may connect two nodes and may therefore correspond to a common attribute shared between the clinicians corresponding to the two nodes connected by the edge. The peer community controller 230 may form the peer network 300 by at least identifying clinicians who share common attributes (e.g., nodes that should be interconnected by an edge) and/or clinicians who do not share any common attributes (e.g., nodes that should not be left unconnected).

For instance, the peer community controller 230 may determine that two nodes should be interconnected by an edge if the clinicians corresponding to the nodes treat at least one common patient. Accordingly, the edge connecting the first clinician 310a and the second clinician 310b may correspond to one or more patients 320a who are treated by the first clinician 310a as well as the second clinician 310b. Meanwhile, the edge connecting the second clinician 310b and the third clinician 310c may correspond to one or more patients 320b who are treated by the second clinician 310b as well as the third clinician 310c. It should be appreciated that each edge in the peer network 300 may be associated with a weight representative of strength the affiliation between the nodes connected by the edge. In the example shown in FIG. 3A, the weight associated with an edge in the peer network 300 may correspond to a quantity of patients treated by the clinicians associated with the two nodes connected by the edge.

The peer network 300 may include multiple peer communities. The peer community controller 230 may apply one or more supervised and/or unsupervised machine learning technique to identify the peer communities present in the peer network 300. For instance, the peer community controller 230 may apply a neural network trained to identify the peer communities present in the peer network 300. Alternatively and/or additionally, the peer community controller 230 may also apply alternate techniques including, for example, minimum cut, hierarchical clustering, Girvan-Newman algorithm, modularity maximization, clique detection, and/or the like. Nevertheless, in some example embodiments, the peer community controller 230 may be required to generate the peer network 300 based on multiple attributes before the nodes in the peer network 300 form discernable peer communities.

Figure 3B:
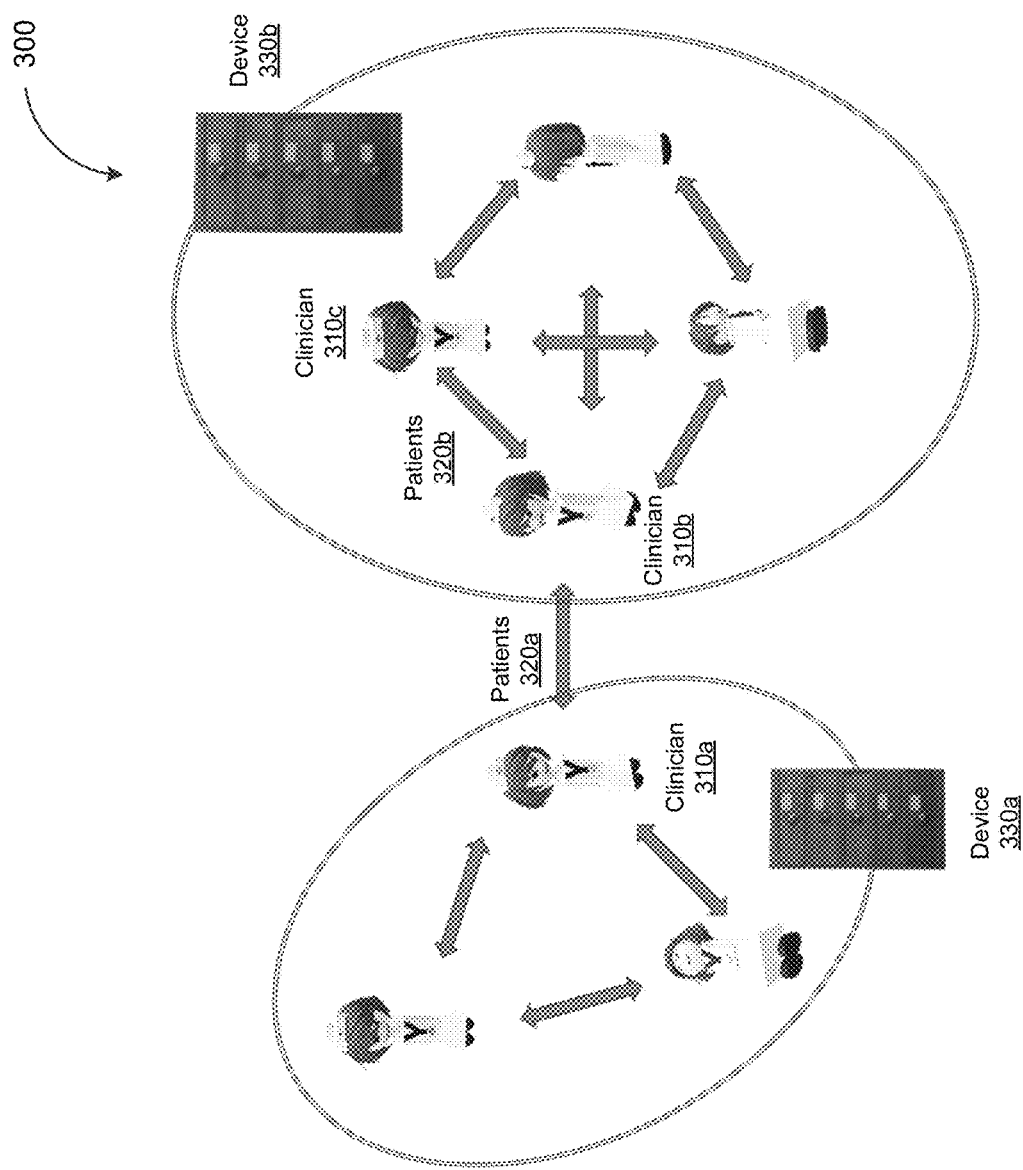
FIG. 3B depicts a graph representative of an example of a peer network, in accordance with some example embodiments.

To further illustrate, FIG. 3B shows the peer network 300 being further refined by applying the medical devices that each of the clinicians in the peer network 300 interacts with. As noted, since clinicians operating in close proximity (e.g., in the same care area and/or the like) should exhibit the same and/or similar activity patterns, the location of medical devices may impose a geographical constraint on membership in each peer community. For instance, as shown in FIG. 3B, in addition to treating the same patients, the first clinician 310a may be further interconnected with one or more other clinicians who interact with the same medical devices and/or medical devices located in a same care area such as, for example, a first device 330a. Likewise, the second clinician 310b and the third clinician 310c may be interconnected with other clinicians who not only treat the same patients but also interact with the same medical devices and/or medical devices located in a same care area such as, for example, a second device 330b. Moreover, as shown in FIG. 3B, while the first clinician 310a and the second clinician 310b may be interconnected because the first clinician 310a and the second clinician 310b treat one or more of the same patients, the first clinician 310a and the second clinician 310b may nevertheless be grouped into separate peer communities based on one or more other attributes including, as shown in FIG. 3B, the medical devices being used by the first clinician 310a and the second clinician 310b. As noted, the care areas in which the first clinician 310a and the second clinician 310b operate may be indicative of the conditions of the patients being treated by the first clinician 310a and the second clinician 310b. Accordingly, while the first clinician 310a and the second clinician 310b may have both treated the same patients, the first clinician 310a and the second clinician 310b may have treated these patients at different points of their care. For example, the first clinician 310a may have treated a patient while that patient was first admitted for emergency care while the second clinician 310b may have treated the same patient but after the patient has stabilized and transitioned to intensive care. Thus, FIG. 3B shows the first clinician 310a and the second clinician 310b as being interconnected but members of different peer communities.

Figure 3C:
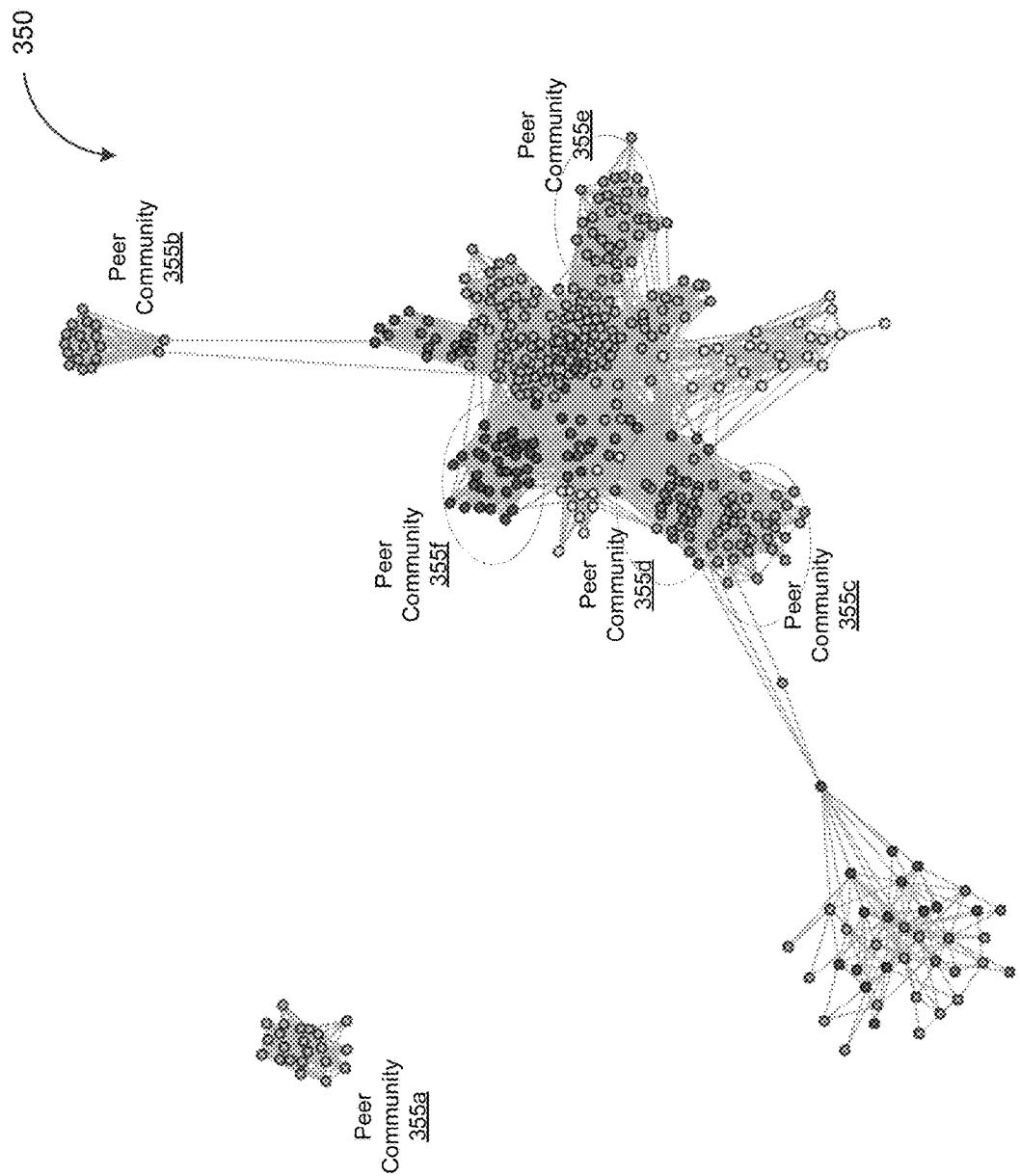
FIG. 3C depicts a graph representative of another example of a peer network, in accordance with some example embodiments.

FIG. 3C depicts a graph illustrating another example of a peer network 350, in accordance with some example embodiments. As shown in FIG. 3C, the peer network 350 may include a plurality of peer communities including, for example, a first peer community 355a, a second peer community 335b, a third peer community 335c, a fourth peer community 335d, a fifth peer community 335e, a sixth peer community 335f, and/or the like. As noted, clinicians in the same peer community may share common attributes and may therefore have the same and/or similar activity patterns whereas clinicians in different peer communities may have different attributes and different activity patterns. Nevertheless, it should be appreciated that a clinician may exhibit varying degrees of affiliation to multiple peer communities. Accordingly, as shown in FIG. 3C, different peer communities such as, for example, the third peer community 335c and the fourth peer community 335d, may overlap due to clinicians are affiliated with multiple peer communities. To segregate overlapping peer communities, the peer community controller 230 may apply additional attributes that differentiate between clinicians who belong to one peer community but not another peer community.

As shown in FIG. 3C, the peer community controller 230 may be configured to identify the plurality of peer communities present in the peer network 350 including, for example, the first peer community 355a, the second peer community 335b, the third peer community 335c, the fourth peer community 335d, the fifth peer community 335e, the sixth peer community 335f, and/or the like. Each of the peer community present in the peer network 350 may correspond to a group of clinicians who share sufficiently similar attributes and should therefore exhibit the same and/or similar activity patterns. For instance, each peer community present in the peer network 350 may correspond to clinicians who treat the same patients as well as interact with the same medical devices and/or medical devices located in the same care area.

By identifying the peer communities of clinicians who share these common attributes, the peer community controller 230 may be able to differentiate between clinicians who have been assigned different shifts, care areas, and/or tasks such as, for example, permanent clinicians, floating clinicians, supplemental clinicians, student clinicians, and charge clinicians. For example, a permanent nurse, float nurse, a supplemental nurse, a student nurse, and a charge nurse may also exhibit different activities patterns because of differences in assigned shifts, care areas, and/or tasks. Accordingly, by grouping clinicians who have been assigned different shifts, care areas, and/or tasks into the appropriate peer communities, the peer community controller 230 may ensure the anomaly detector 240 comparing the activity patterns of clinicians who have been assigned the same and/or similar shifts, care areas, and/or tasks. Moreover, by normalizing the quantities of medication included in at least some of the transaction records representative of the activity patterns of different clinicians, the anomaly detector 240 may ensure that the comparison of activity patterns is not distorted by dosage discrepancies introduced by pharmacological differences between different medications such as potency, form factor (e.g., tablet, patches, liquid), delivery mechanism (e.g., ingestion, infusion), and/or the like.

Figure 4A:
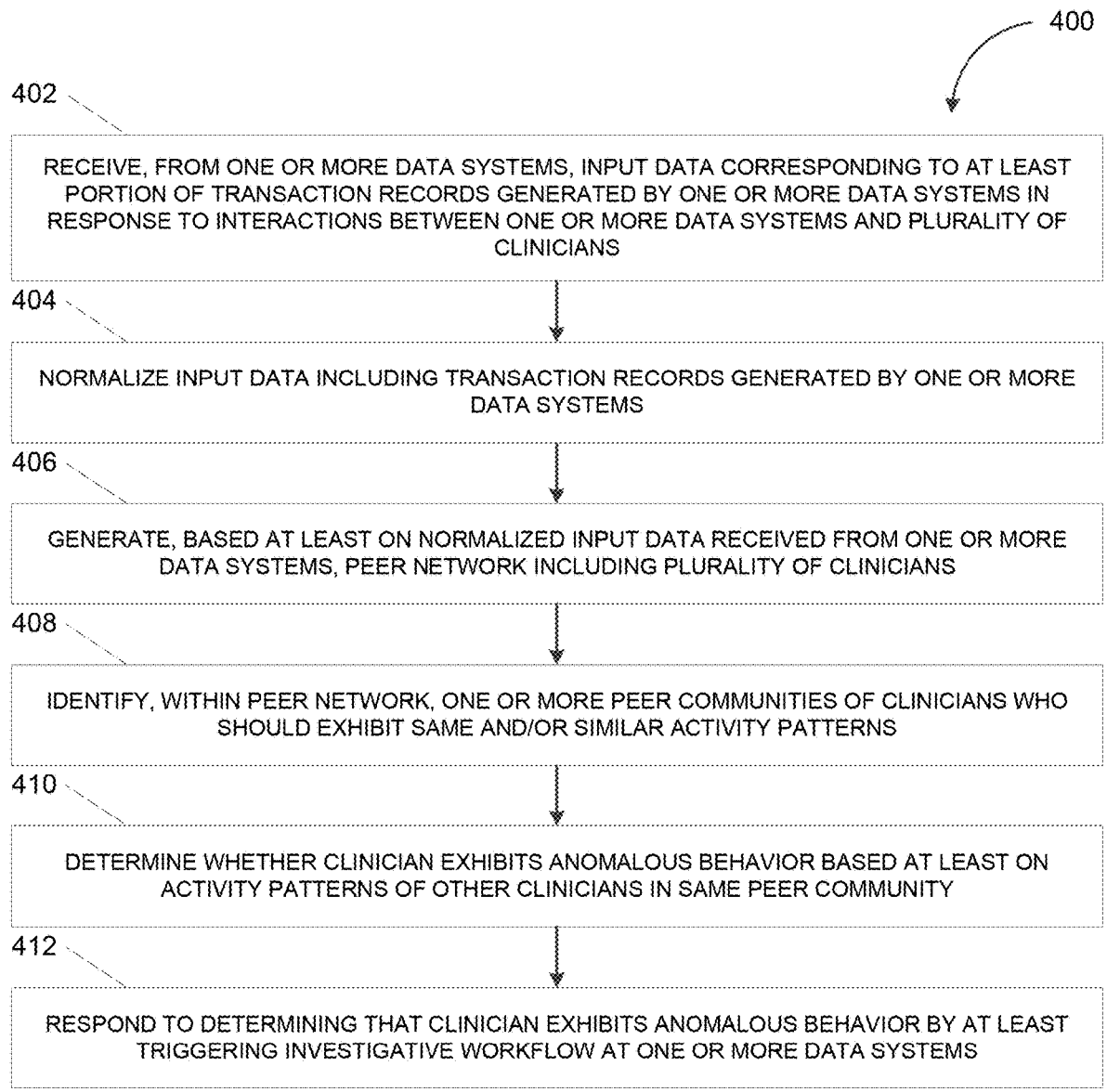
FIG. 4A depicts a flowchart illustrating a process for detecting anomalous behavior, in accordance with some example embodiments.

FIG. 4A depicts a flowchart illustrating a process 400 for detecting anomalous behavior, in accordance with some example embodiments. Referring to FIGS. 1-2, 3A-C, and 4A, the process 400 may be performed, in whole or in part, by the analytics engine 110.

At 402, the analytics engine 110 may receive, from the one or more data systems 120, an input data corresponding to at least a portion of transaction records generated by the one or more data systems 120 in response to interactions between the one or more data systems 120 and a plurality of clinicians. For instance, as shown in FIG. 2, the one or more data systems 120 may include the access control system 220a, the dispensing system 220b, and the electronic medical record (EMR) system 220c. Furthermore, as noted, the one or more data systems 120 may include medical devices such as, for example, dispensing cabinets, infusion pumps, wasting stations, and/or the like. The one or more data systems 120 may generate a transaction record when a clinician interacts with the one or more data systems.

For example, a clinician dispensing a medication from a dispensing cabinet may trigger the generation of a transaction record that includes a timestamp, a clinician identifier of the clinician, a device identifier of the dispensing cabinet, a patient identifier of a patient prescribed the medication, an identifier of the medication retrieved from the dispensing cabinet, a quantity of the medication retrieved from the medication cabinet, and/or the like. Alternatively and/or additionally, a clinician using an infusion pump to administer a medication to a patient may trigger the generation of a transaction record that includes a timestamp, a clinician identifier of the clinician, a device identifier of the infusion pump, a patient identifier of the patient receiving the medication, an identifier of the medication being administered to the patient, a quantity of the medication being administered to the patient, and/or the like.

At 404, the analytics engine 110 may normalize the input data including the transaction records generated by the one or more data systems 120. In some example embodiments, the analytics engine 110 may normalize transaction records in order to enable a comparison between common, analogous, and/or semantically equivalent data originating from different transactions and/or different data systems. One example of normalization may include reconciling analogous data from a first field in a first transaction record generated by a first data system with a different name than a second field in a second transaction record generated by a second data system (e.g., a "PATIENT" field in the first transaction record and a "PATIENT_ID" in the second transaction record).

Alternatively and/or additionally, the analytics engine 110 may normalize transaction records including raw quantities of medications in order to enable a meaningful comparison between different medications that must be administered in different quantities to achieve a comparable clinical effect. For instance, due to differences in potency, form factor, and/or delivery mechanism, a first pain medication (e.g., Tramadol) may require a higher dosage to achieve a comparable clinical effect as a second pain medication (e.g., Fentanyl). Accordingly, the analytics engine 110 may normalize, to a morphine equivalent unit such as milligram morphine equivalent (MME), a first quantity of the first pain medication included in a first transaction record including a first quantity of the first pain medication and a second quantity of the second pain medication included in the second transaction record.

At 406, the analytics engine 110 may form, based at least on the normalized input data received from the one or more data systems 120, a peer network including the plurality of clinicians. In some example embodiments, the analytics engine 110 may form, for example, the peer network 300, based on one or more attributes associated with a plurality of clinicians including, for example, the patients treated by each clinician, the medical devices each clinician interacts with, and/or the like. For instance, the analytics engine 110 may form the peer network 300 by at least interconnecting a plurality of nodes corresponding to clinicians with edges that correspond to common attributes shared between the clinicians. In the example shown in FIG. 3A, the edges may correspond to one or more patients who treated by the clinicians corresponding to the nodes interconnected by the edges. Meanwhile, FIG. 3B shows that in addition to treating the same patients, the nodes in the peer network 300 may be further interconnected based on the corresponding clinicians interacting with the same medical devices and/or medical devices located in a same care area.

At 408, the analytics engine 110 may identify, within the peer network, one or more peer communities of clinicians who should exhibit the same and/or similar activity patterns. In some example embodiments, the analytics engine 110 may identify, in the peer network 300, one or more peer communities of clinicians who share sufficiently similar attributes such that the clinicians in the same peer community should also exhibit the same and/or similar activity patterns. For example, as noted, the analytics engine 110 may apply a machine learning model trained to identify the one or more peer communities of clinicians that are present in, for example, the peer network 300. Alternatively and/or additionally, the analytics engine may 110 identify the peer communities by applying an alternate technique such as, for example, minimum cut, hierarchical clustering, Girvan-Newman algorithm, modularity maximization, clique detection, and/or the like.

At 410, the analytics engine 110 may determine whether a clinician exhibits anomalous behavior based at least on the activity patterns of other clinicians in a same peer community. For example, the analytics engine 110 may be configured to determine whether a clinician exhibits anomalous behavior by comparing the activity patterns of the clinician to the activity patterns of other clinicians in the same peer community. In some example embodiments, the activity patterns of the clinician may include a series of transaction records, which generated when the clinician interacts with the one or more data systems 120. Furthermore, the series of transaction records may be divided temporally to correspond, for example, to the shifts associated with the clinician. The analytics engine 110 may determine that the clinician exhibits anomalous behavior if the activity patterns of the clinician deviate from the activity patterns of other clinicians in the same peer community. For instance, the analytics engine 110 may assign, to the clinician, a rank corresponding to how much the activity patterns of the clinician deviate from the expected norms for the peer community of the clinician. The analytics engine 110 may determine that the clinician exhibits anomalous behavior if the clinician is ranked above or below a threshold value.

In some example embodiments, the anomaly detector 240 may apply a machine learning model trained to determine, based on one or more transaction records representative of the activity pattern of a clinician, whether the clinician exhibits anomalous behavior. As noted, this machine learning model may be trained to perform anomaly detection (or outlier detection) using training data that includes normalized quantities of different pain medications. For example, the training data may include transaction records in which the quantities of medication are normalized to a morphine equivalent unit such as milligram morphine equivalents (MME). Moreover, the transaction records may be representative of non-anomalous activity patterns such as administering a low potency pain medication in large quantities and/or at high frequencies that are the norm for the corresponding peer community. Alternatively and/or additionally, the transaction records may be representative of anomalous activity patterns such as administering a high potency pain medication in quantities and/or at frequencies that deviate from the norm for the peer community.

Raw quantities of medications may be normalized, for example, at operation 404, to a morphine equivalent unit such as milligram morphine equivalents (MME) in order to enable a meaningful analysis of the activity patterns of a first clinician who administers the first quantity of the first pain medication and a second clinician who administers the second quantity of the second pain medication. In some example embodiments, raw quantities of medications may be normalized in order to eliminate dosage discrepancies introduced by pharmacological differences (e.g., in potency, form factor, delivery mechanism, and/or the like) that require the medications to be administered in different dosages in order to achieve a comparable clinical effect. The normalization may further extend to the identifier associated with different medications such that the analytics engine 110 is able to identify comparable medications, such as medications having a same or similar ingredients, with different identifiers.

Absent the normalization, comparisons based on the raw quantities of different pain medications may gave rise to false negatives or false positives of the first clinician and/or the second clinician administering medication in anomalous quantities and/or at anomalous frequencies. For example, the normalized quantities administered by the first clinician and the second clinician may be analyzed relative to a norm for a peer community including the two clinicians. If the norm for the peer community is n milligram morphine equivalents (MME) of pain medication, then the first clinician may be identified as culpable of diversion or overmedication if the first quantity of the first pain medication administered by the first clinician is more than a threshold above n milligram morphine equivalents. Alternatively, the second clinician may be identified as culpable of undermedication if the second quantity of the second pain medication administered by the second clinician is more than a threshold below n milligram morphine equivalents.

Another example of anomalous behavior may include a clinician prescribing, dispensing, administering, and/or wasting an excessively large proportion of high potency pain medications relative to the norm for the peer community associated with the clinician, meaning that the clinician may be selectively targeting high potency drugs. Alternatively and/or additionally, the anomaly detector 240 may detect anomalous behavior, in particular an escalation in such behavior, if the clinician prescribes, dispenses, administers, and/or wastes increasingly more potent pain medications and/or increasingly higher normalized quantities of pain medications.

At 412, the analytics engine 110 may respond to determining that the clinician exhibits anomalous behavior by at least triggering an investigative workflow at one or more of the data systems 120. For example, the investigative workflow may include the analytics engine 110 generating and sending an alert to the client device 250 via the network 210. Alternatively and/or additionally, the investigative workflow may include the analytics engine 110 configuring the one or more data systems 120 to activate one or more surveillance devices at the medical devices accessed by the clinician and/or isolate medication accessed by the clinician. For instance, the analytics engine 110 may configure a dispensing cabinet to activate one or more surveillance devices (e.g., video cameras, still image cameras, audio recorders, and/or the like) whenever the clinician accesses the dispensing cabinet to retrieve medication. Alternatively and/or additionally, the analytics engine 110 may configure a wasting station to isolate unused medication that the clinician disposes at the wasting station. For instance, instead of a shared receptacle that comingles unused medication disposed by multiple clinicians, the wasting station may be configured to provide the clinician with a separate receptacle.

In some implementations, triggering the investigative workflow may include activating a sensor or other collection device within the clinician tracking system 100. The activation may include transmitting a control message to a device to configure the device to initiate collection of information for the investigative workflow such as biometrics of the target of the investigation, electronic medical records for patients interacted with by or near the target of the investigation, location information for the target during one or more shifts, peer clinician information (e.g., peers working with or near to the target), etc. This can be particularly useful to collect information without necessarily alerting a target of the investigation of the investigation. If the target of the investigation were made aware of the data collection, the target of the investigation may alter behavior or take further steps to avoid detection or undermine the integrity of the investigation. Such features provide a technical solution to ensure efficiency and reliability of the investigative workflow.

Figure 4B:
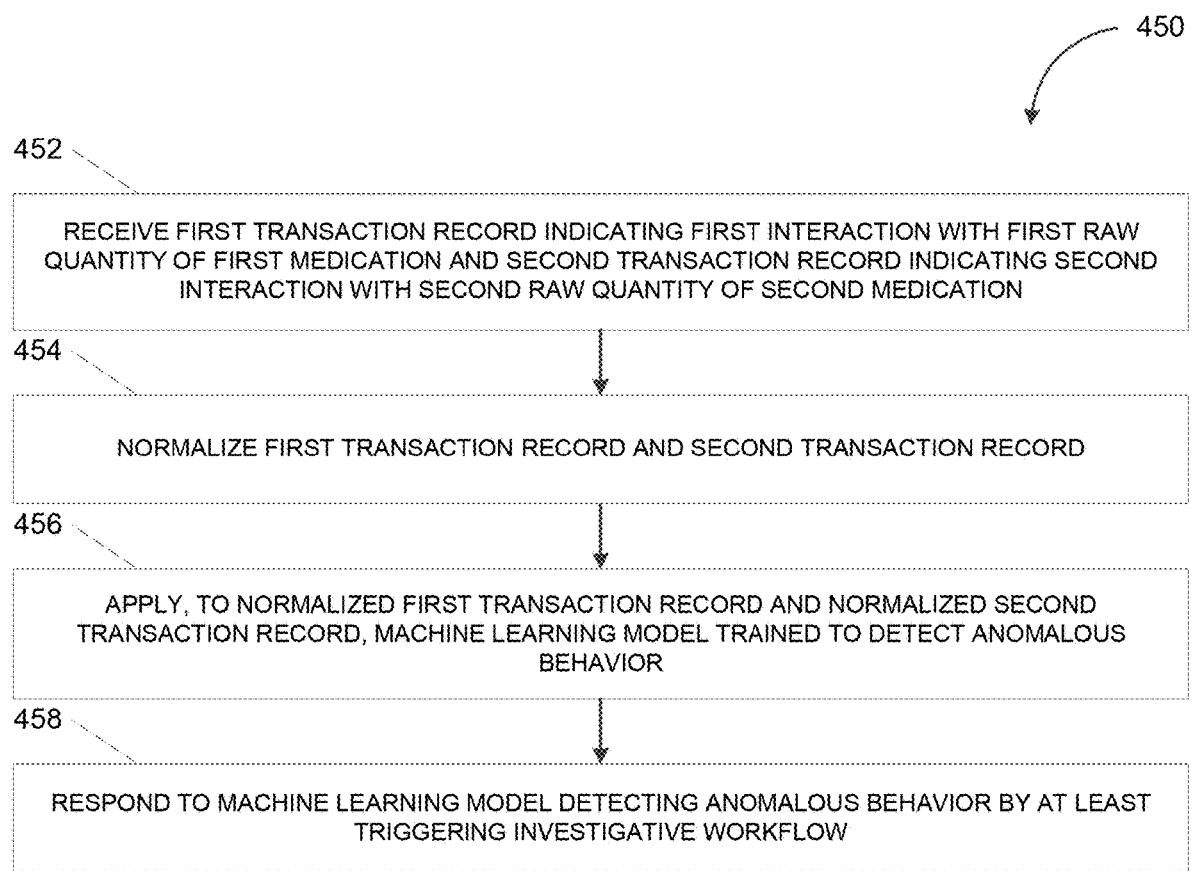
FIG. 4B depicts a flowchart illustrating a process for detecting anomalous behavior, in accordance with some example embodiments.

FIG. 4B depicts a flowchart illustrating a process 450 for detecting anomalous behavior, in accordance with some example embodiments. Referring to FIGS. 1-2, 3A-C, and 4B, the process 400 may be performed, in whole or in part, by the analytics engine 110.

At 452, the analytics engine 110 may receive a first transaction record indicating a first interaction with a first raw quantity of a first medication and a second transaction record indicating a second interaction with a second raw quantity of a second medication. In some example embodiments, the analytics engine 110 may receive, from the one or more data systems 120, transaction records associated with the prescription, the dispensing, the administration, and/or the wasting of one or more medications. For example, the analytics engine 110 may receive a first transaction record associated with a first pain medication (e.g., Tramadol) and a second transaction record may be associated with a second pain medication (e.g., Fentanyl) having a different potency, form factor, and/or delivery mechanism as the first medication. The first pain medication and the second pain medication may therefore require a different dosage to achieve a comparable clinical effect, which renders a comparison of the raw quantities of the two medications invalid.

At 454, the analytics engine 110 may normalize the first transaction record and the second transaction record. For example, the analytics engine 110 may normalize, based at least on a morphine equivalent unit such as milligram morphine equivalents (MME), the first raw quantity of the first pain medication and the second raw quantity of the second pain medication. Doing so may eliminate the dosage discrepancies introduced by pharmacological differences (e.g., in potency, form factor, delivery mechanism, and/or the like) between the two pain medications such that the analytics engine 110 is able to perform a meaningful comparison between the activity patterns of clinicians who interact with the first pain medication and the second pain medication. Moreover, as noted, the normalization may include normalizing the identifiers associated with comparable pain medications. This may be the case, for example, where the first pain medication and the second pain medication include the same or similar ingredients but are assigned different names.

The normalization process for a medication may include retrieving information about a medication indicative of at least a portion of the ingredients for the medication. The information may be retrieved from a drug library or formulary of the clinic or from a third-party data service such as those services provided by First Databank, Inc. of South San Francisco, California. The standard information may then be used in conjunction with a quantity to calculate a MME. In some implementations, the medication may not be identifiable such as because the medication is new or because the medication is referenced according to a local naming convention or because of a data entry error. To improve the robustness of the normalization process, the normalization process may include normalization of the medication name. One example is to maintain a thesaurus of medication names that identify relationships between medications with different names.

At 456, the analytics engine 110 may apply, to the normalized first transaction record and the normalized second transaction record, a machine learning model trained to detect an anomalous behavior. In some example embodiments, the analytics engine 110 may apply a machine learning model trained to determine, based on the first transaction record and the second transaction record, whether a clinician associated with the two transaction records exhibits anomalous behavior. Examples of anomalous behavior may include diversion, medical error, and/or the like. Moreover, the machine learning model may be trained using normalized transaction records in which the quantities of medications included in the transaction records are measured in a morphine equivalent unit such as milligram morphine equivalents (MME).

Normalizing raw dosages of different pain medications may, as noted, enable a meaningful comparison between the activity patterns of clinicians who interact with the pain medications. The prescription, dispensing, administration, and/or wasting of an excessively large normalized quantities a pain medication may be one example of anomalous behavior as is the prescription, dispensing, administration, and/or wasting of pain medication at excessive frequencies. The analytics engine 110 may also detect anomalous behavior if a clinician prescribes, dispenses, administers, and/or wastes an excessively large proportion of high potency pain medications relative to the norm for the peer community associated with the clinician, meaning that the clinician may be selectively targeting high potency drugs. Alternatively and/or additionally, the anomaly detector 240 may detect anomalous behavior, in particular an escalation in such behavior, if the clinician prescribes, dispenses, administers, and/or wastes increasingly more potent pain medications and/or increasingly higher normalized quantities of pain medications.

At 458, in response to the machine learning model detecting the anomalous behavior, the analytics engine 110 may trigger an investigative workflow. For example, the investigative workflow may include generating an alert identifying the clinician exhibiting anomalous behavior. The alert may indicate, for example, the prescription, dispensing, administration, and/or wasting of an improper quantity of medication, an improper potency medication, and/or the like. Alternatively and/or additionally, the investigative workflow may include configuring one or more of the data systems 120 such as to activate one or more surveillance devices (e.g., video cameras, still image cameras, audio recorders, and/or the like) at a medical device (e.g., dispensing cabinet, infusion pump, wasting station, and/or the like) whenever the clinician accesses the medical device. The medical device may also be configured, for example, as part of the investigative workflow, to isolate medication accessed by the clinician.

Figure 5:
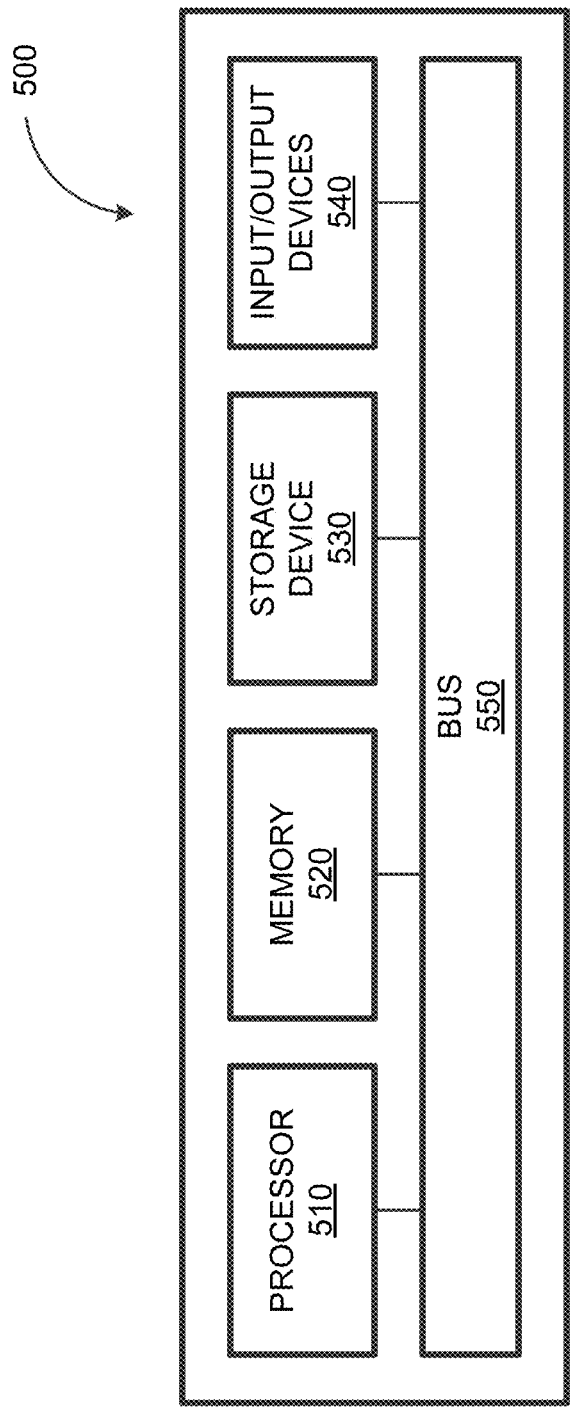
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1-5, the computing system 500 can be used to implement the analytics engine 110 and/or any components therein.

As shown in FIG. 5, the computing system 500 can include a processor 510, a memory 520, a storage device 530, and input/output device 540. The processor 510, the memory 520, the storage device 530, and the input/output device 540 can be connected via a system bus 550. The processor 510 is capable of processing specific instructions for execution within the computing system 500 for a peer community based technique for detecting anomalous behavior and dynamically configuring device based thereon. Such executed instructions can implement one or more components of, for example, the analytics engine 110. In some example embodiments, the processor 510 can be a single-threaded processor. Alternatively, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, a tape device, a solid-state device, and/or any other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute specific peer community anomaly detection software applications. These applications can be used to perform various functionalities within a clinician tracking system (such as shown in FIG. 1), e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one specifically configured programmable processor, which can be special or general purpose, coupled to receive data and specific instructions from, and to transmit data and instructions to, a storage system, at least one input device, and at least one output device. The programmable system or computing system may include one or more clients and/or servers. A client and server are generally remote from each other and typically interact through a communication network. The relationship of client and server arises by virtue of computer programs running on the respective computers and having a client-server relationship to each other.

These specific computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible. The term "correspond" or "corresponds" or "corresponding" may include comparing at least two values where the at least two values exactly match, fuzzy match, phonetically match, match within a predetermined tolerance (e.g., plus or minus), match according to a predetermined relationship (e.g., score based on dynamically generated weights), or other measure comparing the at least two values.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

As used herein, the terms "determine" or "determining" encompass a wide variety of actions. For example, "determining" may include calculating, computing, processing, deriving, generating, obtaining, looking up (e.g., looking up in a table, a database or another data structure), ascertaining and the like via a hardware element without user intervention. Also, "determining" may include receiving (e.g., receiving information), accessing (e.g., accessing data in a memory) and the like via a hardware element without user intervention. "Determining" may include resolving, selecting, choosing, establishing, and the like via a hardware element without user intervention.

As used herein, the terms "provide" or "providing" encompass a wide variety of actions. For example, "providing" may include storing a value in a location of a storage device for subsequent retrieval, transmitting a value directly to the recipient via at least one wired or wireless communication medium, transmitting or storing a reference to a value, and the like. "Providing" may also include encoding, decoding, encrypting, decrypting, validating, verifying, and the like via a hardware element.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

In any embodiment, data can be forwarded to a "remote" device or location," where "remote," means a location or device other than the location or device at which the program is executed. For example, a remote location could be another location (e.g., office, lab, etc.) in the same city, another location in a different city, another location in a different state, another location in a different country, etc. As such, when one item is indicated as being "remote" from another, what is meant is that the two items can be in the same room but separated, or at least in different rooms or different buildings, and can be at least one mile, ten miles, or at least one hundred miles apart. "Communicating" information references transmitting the data representing that information as electrical signals over a suitable communication channel (e.g., a private or public network). "Forwarding" an item refers to any means of getting that item from one location to the next, whether by physically transporting that item or otherwise (where that is possible) and includes, at least in the case of data, physically transporting a medium carrying the data or communicating the data. Examples of communicating media include radio or infra-red transmission channels as well as a network connection to another computer or networked device, and the internet or including email transmissions and information recorded on websites and the like.

Some embodiments include implementation on a single computer, or across a network of computers, or across networks of networks of computers, for example, across a network cloud, across a local area network, on hand-held computer devices, etc. The computers may be physical machines or virtual machines hosted by other computers. In certain embodiments, one or more of the steps described herein are implemented on a computer program(s). Such computer programs execute one or more of the steps described herein. In some embodiments, implementations of the subject method include various data structures, categories, and modifiers described herein, encoded on computer-readable medium(s) and transmissible over communications network(s).

What is claimed is:

1. A system, comprising:
   at least one data processor; and
   at least one memory storing instructions which, when executed by the at least one data processor, result in operations comprising:
   receiving, from one or more data systems, a first transaction record indicating a first interaction with a first raw quantity of a first medication and a second transaction record indicating a second interaction with a second raw quantity of a second medication, wherein the first transaction record and the second transaction record are associated with a first clinician;
   normalizing the first transaction record and the second transaction record associated with the first clinician, the normalizing including generating, based at least on an equivalent unit comprising a morphine equivalent unit, a first normalized quantity of the first medication and a second normalized quantity of the second medication, wherein the first normalized quantity of the first medication and the second normalized quantity of the second medication eliminates discrepancies introduced by pharmacological differences in at least one of a potency, a form factor, and a delivery mechanism of the first raw quantity of the first medication and the second raw quantity of the second medication;
   detecting anomalous behavior by applying, to the normalized first transaction record including the first normalized quantity of the first medication and the normalized second transaction record including the second normalized quantity of the second medication, a first machine learning model, wherein the first machine learning model is trained to detect anomalous behavior based on training data comprising one or more training transaction records comprising normalized quantities of one or more medications, wherein the normalized quantities of one or more medications comprises a morphine equivalent unit, and the one or more training transaction records are associated with one or more clinicians in a same peer community as the first clinician, wherein the one or more clinicians in the same peer community are identified by at least applying a second machine-learning model trained to identify one or more peer communities of the first clinician, and wherein the first machine learning model detects the anomalous behavior when at least one of the first normalized quantity and/or the second normalized quantity deviates from a predetermined acceptable range for normalized quantities of medications for the peer community identified by the second machine-learning model; and
   in response to the first machine learning model detecting the anomalous behavior, triggering an investigative workflow at one or more data systems by controlling operation of a surveillance device and/or a medical device for isolating medications.

2. The system of claim 1, wherein the first machine learning model is trained based at least on a third transaction record associated with a second clinician in a same peer community as the first clinician, and wherein the third transaction record is normalized based at least on the equivalent unit.

3. The system of claim 2, further comprising:
the one or more peer communities present in a peer network, the peer network including a plurality of clinicians, and the peer community including the first clinician and the second clinician from the plurality of clinicians based at least on the first clinician and the second clinician sharing at least one common attribute.

4. The system of claim 3, wherein the anomalous behavior is detected based at least on the first normalized quantity and/or the second normalized quantity deviating from a norm for the peer community.

5. The system of claim 3, wherein the anomalous behavior is detected based at least on a potency of the first medication and/or the second medication deviating from a norm for the peer community.

6. The system of claim 3, wherein the anomalous behavior is detected based at least on a frequency of the first interaction with the first medication and/or the second interaction with the second medication deviating from a norm for the peer community.

7. The system of claim 3, wherein the at least one common attribute includes one or more of a patient, a medical device, a prescription order, a clinician role, a shift, a supervisor, an educational background, training, an assigned care area, a medical protocol, and a physical layout of a facility.

8. The system of claim 3, wherein the second machine learning model comprises a neural network, a minimum cut, a hierarchical clustering, a Girvan-Newman algorithm, a modularity maximization, and/or a clique detection.

9. The system of claim 1, wherein the first machine learning model comprises a regression model, an instance-based model, a regularization model, a decision tree, a Bayesian model, a clustering model, an associative model, a neural network, a deep learning model, a dimensionality reduction model, and/or an ensemble model.

10. The system of claim 1, wherein the first interaction comprises one or more of a prescription, a dispensing, an administration, and/or a wasting of the first medication, and wherein the second interaction comprises one or more of a prescription, a dispensing, an administration, and/or a wasting of the second medication.

11. The system of claim 1, wherein the investigative workflow includes sending, to a client, an alert identifying one or more clinicians exhibiting the anomalous behavior.

12. The system of claim 1, wherein the investigative workflow includes activating one or more surveillance devices in response to one or more clinician associated with the anomalous behavior accessing the one or more data systems.

13. The system of claim 1, wherein the anomalous behavior includes a diversion of medication, an overmedication, and/or an undermedication.

14. The system of claim 1, wherein the one or more data systems include an access control system, a dispensing system, and/or an electronic medical record (EMR) system.

15. A computer-implemented method, comprising:
receiving, from one or more data systems, a first transaction record indicating a first interaction with a first raw quantity of a first medication and a second transaction record indicating a second interaction with a second raw quantity of a second medication, wherein the first transaction record and the second transaction record are associated with a first clinician;
normalizing the first transaction record and the second transaction record associated with the first clinician, the normalizing including generating, based at least on an equivalent unit comprising a morphine equivalent unit, a first normalized quantity of the first medication and a second normalized quantity of the second medication, wherein the first normalized quantity of the first medication and the second normalized quantity of the second medication eliminates discrepancies introduced by pharmacological differences in at least one of a potency, a form factor, and a delivery mechanism of the first raw quantity of the first medication and the second raw quantity of the second medication;
detecting anomalous behavior by applying, to the normalized first transaction record including the first normalized quantity of the first medication and the normalized second transaction record including the second normalized quantity of the second medication, a first machine learning model, wherein the first machine learning model is trained to detect anomalous behavior based on training data comprising one or more training transaction records comprising normalized quantities of one or more medications, wherein the normalized quantities of one or more medications comprises a morphine equivalent unit, and the one or more training transaction records are associated with one or more clinicians in a same peer community as the first clinician, wherein the one or more clinicians in the same peer community are identified by at least applying a second machine-learning model trained to identify one or more peer communities of the first clinician, and wherein the first machine learning model detects the anomalous behavior when at least one of the first normalized quantity and/or the second normalized quantity deviates from a predetermined acceptable range for normalized quantities of medications for the peer community identified by the second machine-learning model; and
in response to the first machine learning model detecting the anomalous behavior, triggering an investigative workflow at one or more data systems by controlling operation of a surveillance device and/or a medical device for isolating medications.

16. The method of claim 15, wherein the first machine learning model is trained based at least on a third transaction record associated with a second clinician in a same peer community as the first clinician, wherein the third transaction record is normalized based at least on the equivalent unit, wherein the one or more peer communities are present in a peer network, wherein the peer network includes a plurality of clinicians, and wherein the peer community including the first clinician and the second clinician from the plurality of clinicians based at least on the first clinician and the second clinician sharing at least one common attribute.

17. The system of claim 16, wherein the anomalous behavior is detected based on at least one of the first normalized quantity and/or the second normalized quantity deviating from a norm for the peer community, a potency of the first medication and/or the second medication deviating from the norm for the peer community, and a frequency of the first interaction with the first medication and/or the second interaction with the second medication deviating from the norm for the peer community.

18. A non-transitory computer readable medium storing instructions, which when executed by at least one data processor, result in operations comprising:

receiving, from one or more data systems, a first transaction record indicating a first interaction with a first raw quantity of a first medication and a second transaction record indicating a second interaction with a second raw quantity of a second medication, wherein the first transaction record and the second transaction record are associated with a first clinician;

normalizing the first transaction record and the second transaction record associated with the first clinician, the normalizing including generating, based at least on an equivalent unit comprising a morphine equivalent unit, a first normalized quantity of the first medication and a second normalized quantity of the second medication, wherein the first normalized quantity of the first medication and the second normalized quantity of the second medication eliminates discrepancies introduced by pharmacological differences in at least one of a potency, a form factor, and a delivery mechanism of the first raw quantity of the first medication and the second raw quantity of the second medication;

detecting anomalous behavior by applying, to the normalized first transaction record including the first normalized quantity of the first medication, and the normalized second transaction record including the second normalized quantity of the second medication, a machine learning model trained to detect anomalous behavior based on training data comprising one or more training transaction records comprising normalized quantities of one or more medications, wherein the normalized quantities of one or more medications comprises a morphine equivalent, and the one or more training transaction records are associated with one or more clinicians in a same peer community as the first clinician, wherein the one or more clinicians in the same peer community are identified by at least applying a second machine-learning model trained to identify one or more peer communities of the first clinician, and wherein the first machine learning model detects the anomalous behavior when at least one of the first normalized quantity and/or the second normalized quantity deviates from a predetermined acceptable range for normalized quantities of medications for the peer community identified by the second machine-learning model; and in response to the machine learning model detecting the anomalous behavior, triggering an investigative workflow at one or more data systems by controlling operation of a surveillance device and/or a medical device for isolating medications.

\* \* \* \* \*